United States Patent
Togami et al.

(10) Patent No.: US 8,126,161 B2
(45) Date of Patent: Feb. 28, 2012

(54) ACOUSTIC ECHO CANCELLER SYSTEM

(75) Inventors: Masahito Togami, Higashiyamato (JP); Shinji Sakano, Kamakura (JP); Toshiyuki Matsuda, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1121 days.

(21) Appl. No.: 11/933,482

(22) Filed: Nov. 1, 2007

(65) Prior Publication Data

US 2008/0107281 A1 May 8, 2008

(30) Foreign Application Priority Data

Nov. 2, 2006 (JP) ................ 2006-298407
Mar. 30, 2007 (JP) ................ 2007-090206

(51) Int. Cl.
*H04M 15/00* (2006.01)
*H04M 9/08* (2006.01)
(52) U.S. Cl. .............. 381/94.3; 379/406.08
(58) Field of Classification Search .......... 381/66, 381/93, 94.1, 94.3; 379/406.01–406.03, 379/406.05–406.08; 370/286, 289, 290, 370/291; 455/570
See application file for complete search history.

(56) References Cited

U.S. PATENT DOCUMENTS

| | | | | |
|---|---|---|---|---|
| 4,621,173 A | * | 11/1986 | Guidoux | 370/291 |
| 4,987,569 A | * | 1/1991 | Ling et al. | 370/292 |
| 6,049,607 A | | 4/2000 | Marash et al. | |
| 6,130,949 A | | 10/2000 | Aoki et al. | |
| 6,856,653 B1 | * | 2/2005 | Taniguchi et al. | 375/285 |
| 2005/0143973 A1 | * | 6/2005 | Taniguchi et al. | 704/200.1 |

FOREIGN PATENT DOCUMENTS

| | | |
|---|---|---|
| JP | 2005-136701 | 5/2005 |
| JP | 2007-267044 | 10/2007 |

OTHER PUBLICATIONS

Peter Heitkamper, "An Adaptation Control for Acoustic Echo Cancellers", IEEE Signal Processing Letters, vol. 4, No. 6, 1997/6.
R. O. Schmidt, "Multiple Emitter Location and Signal Parameter Estimation", IEEE Trans. Antennas and Propagation, vol. 34, No. 3, pp. 276 to 280, 1986.
Masahito Togami, et al., "Auditory Ability of Human Symbiosis Robots "Emiew"", JSAI Technical Report SIG-Challenge-0522-10(10/14), pp. 59 to 64, 2005.
Office Action issued in Japanese Patent Application No. 2007-090206 on Jul. 5, 2011.

* cited by examiner

*Primary Examiner* — Hai Phan
(74) *Attorney, Agent, or Firm* — Antonelli, Terry, Stout & Kraus, LLP.

(57) ABSTRACT

An acoustic echo canceller system having a filter with high suppression performance of acoustic echo, generated by using microphone array having a plurality of microphone elements, judging a band where only a speaker sound is present, based on phase difference among microphones, and carrying out adaptation of an adaptive filter for only such a band.

8 Claims, 19 Drawing Sheets

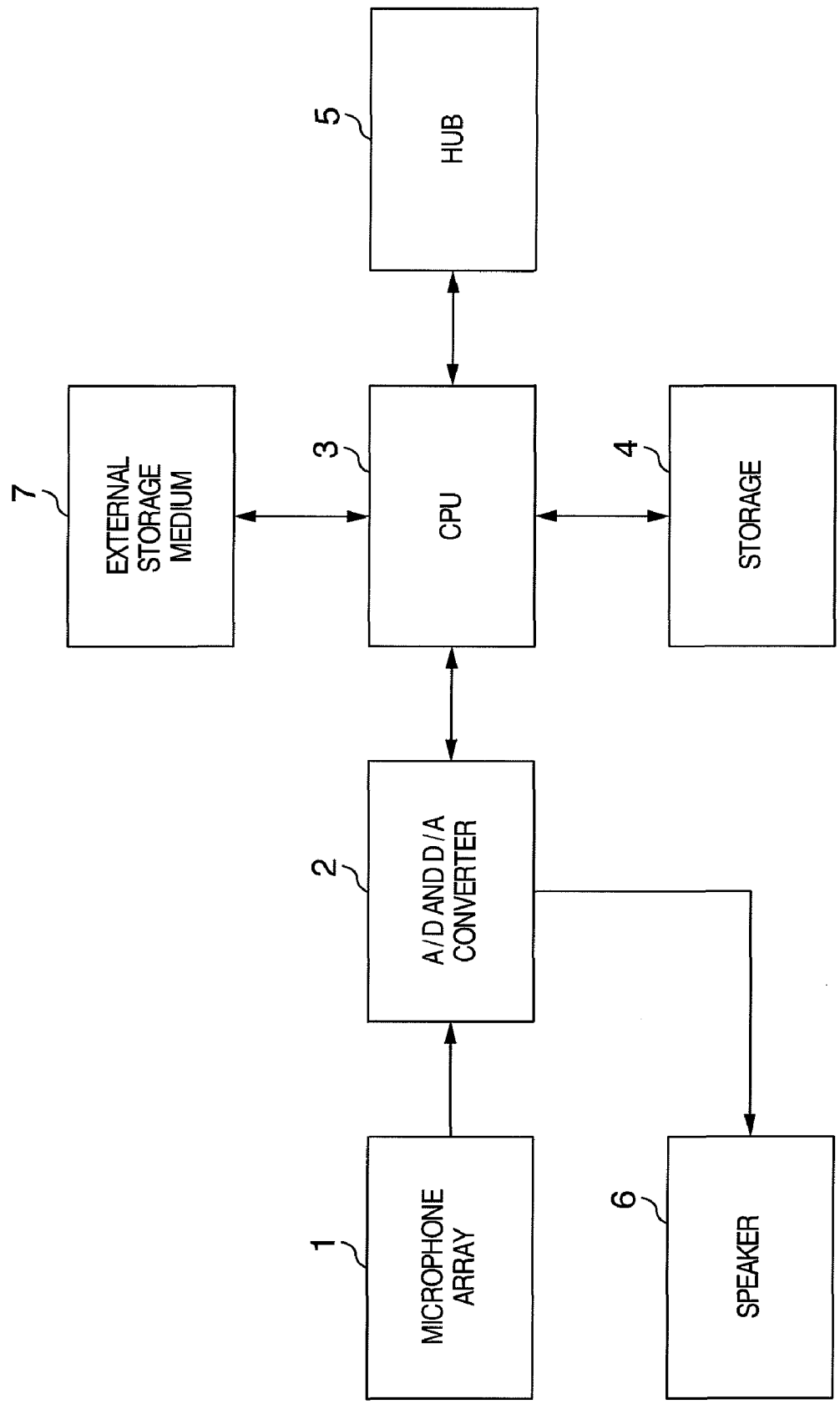

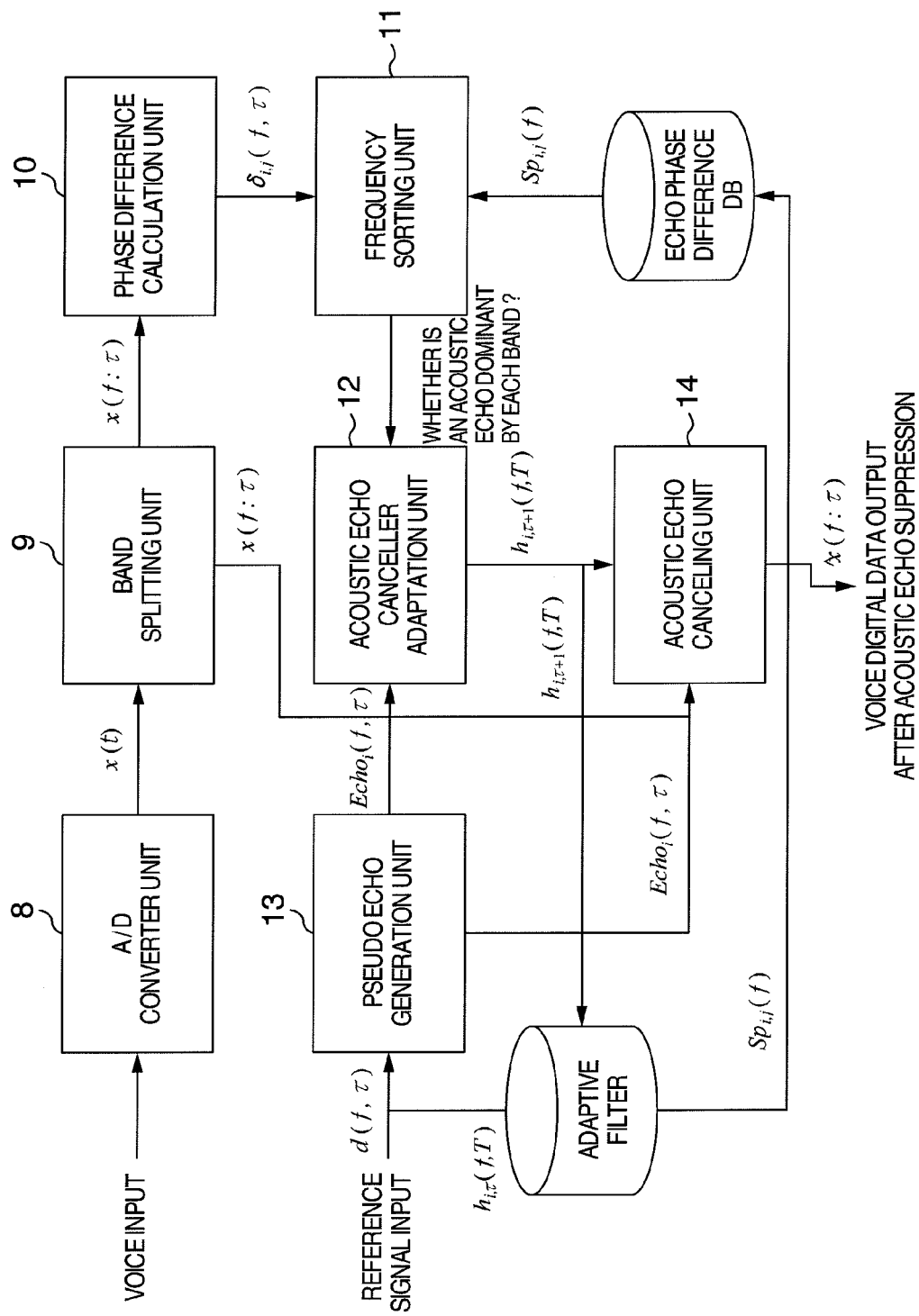

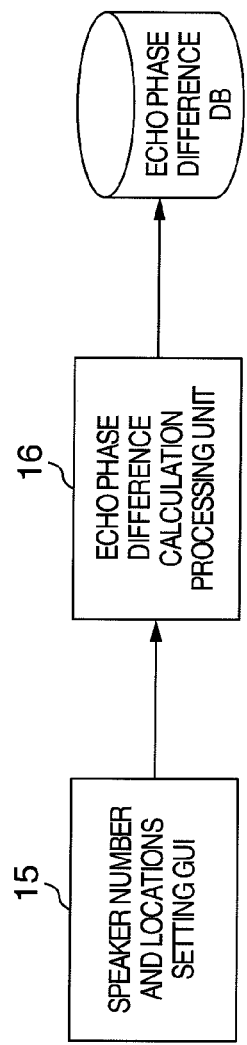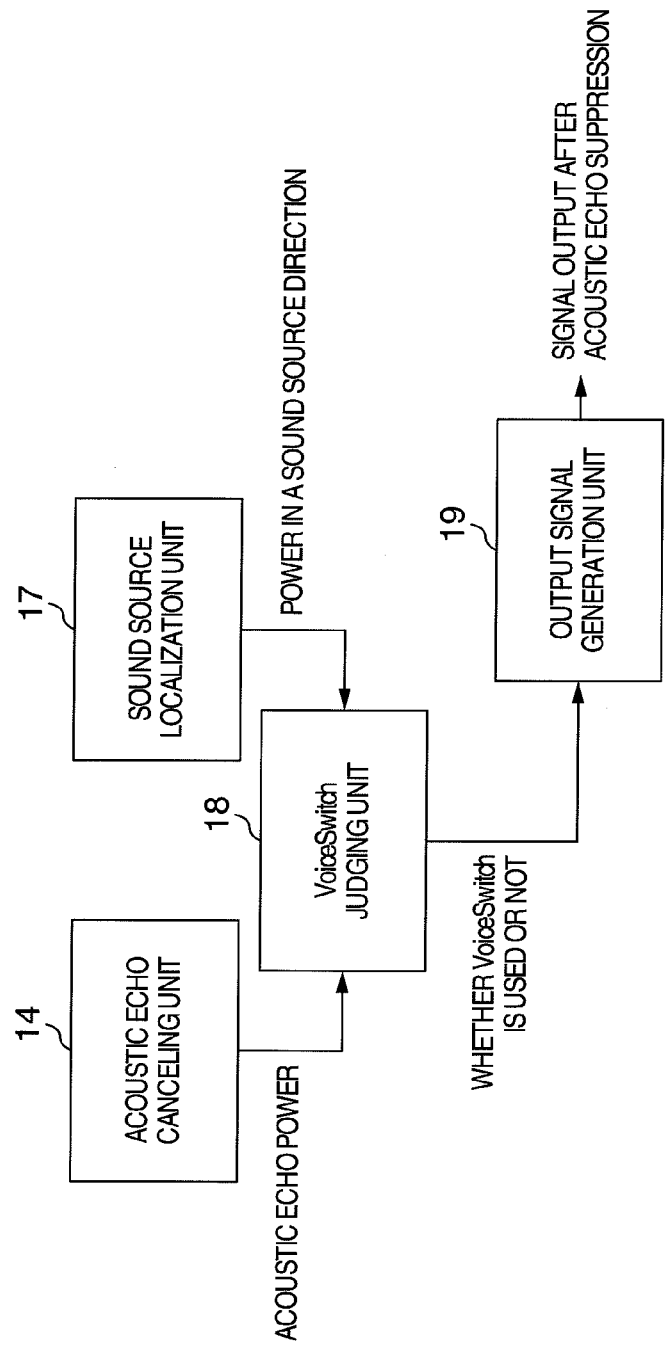

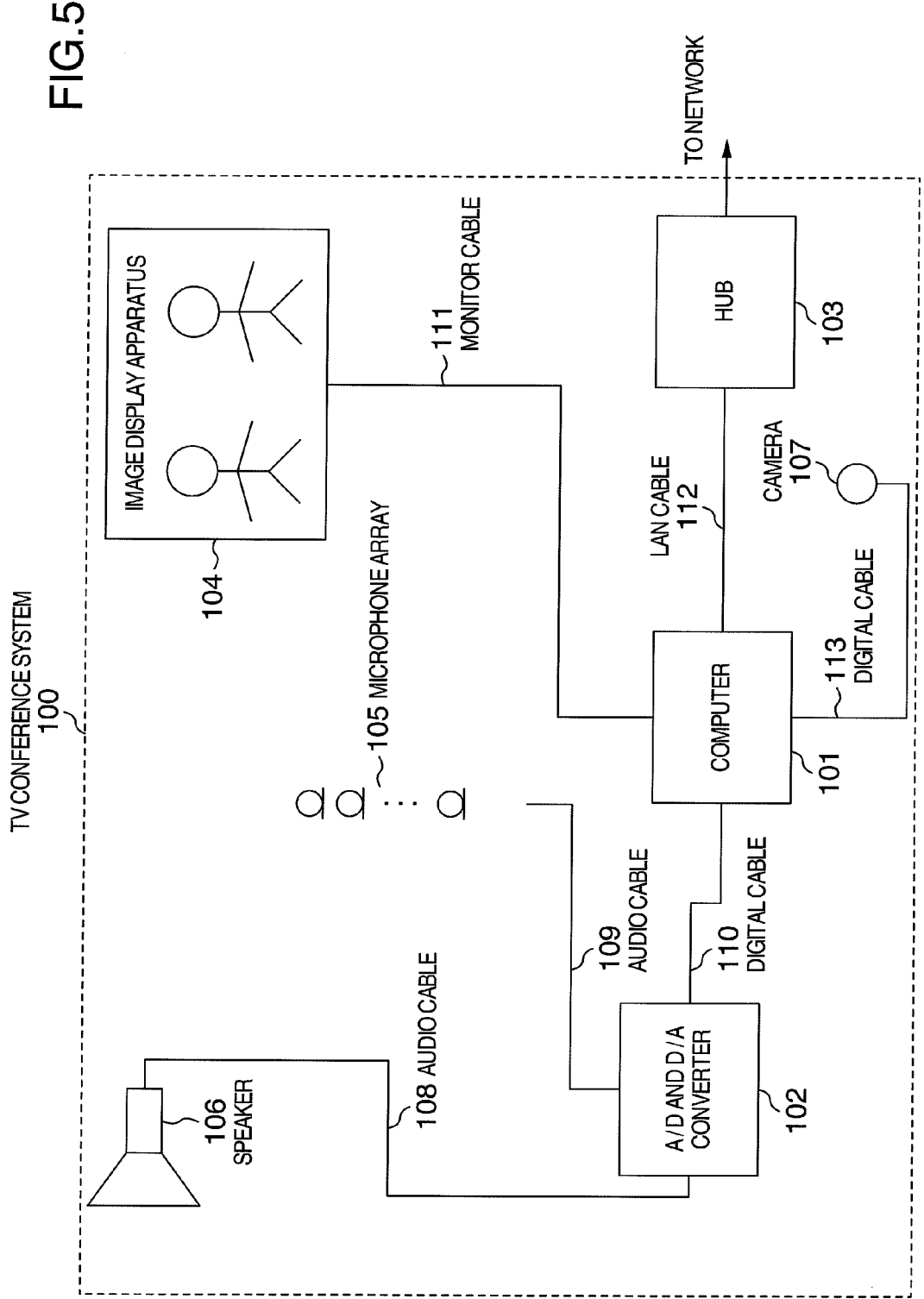

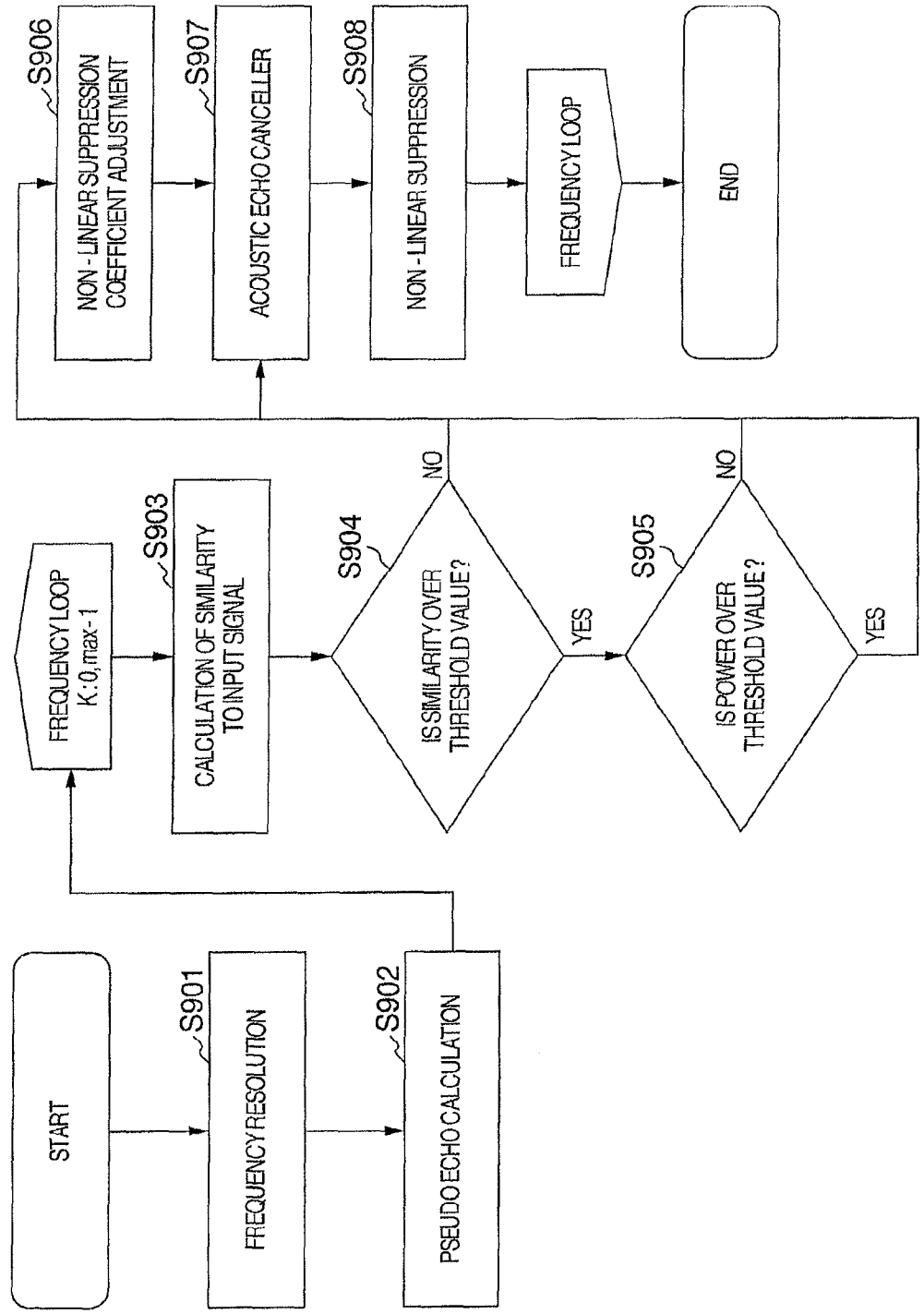

ACOUSTIC ECHO CANCELLER SYSTEM

INCORPORATION BY REFERENCE

The present application claims priority from Japanese application JP2007-090206 filed on Mar. 30, 2007 and JP2006-298407 filed on Nov. 2, 2006, the contents of which are hereby incorporated by reference into this application.

BACKGROUND OF THE INVENTION

The present invention relates to an acoustic echo canceling technology for a telephone conference system provided with speakers and microphones, or for a TV conference system.

There is a telephone conference system or a TV conference system provided with speakers and microphones at both talker-sites, which is capable of providing voice-activated conversation between persons at far ends, by connection with a network. This system had a problem of commingling of a voice output from the speaker to the microphone. Therefore, in the past, it has been carried out to remove a speaker output sound (acoustic echo) commingled into the microphone, using acoustic echo canceller technology. In the case where acoustic environment of a conference room is unchanging, it is possible to completely remove the acoustic echo, by learning a sound transmission way (impulse response) in space only once at the start, and then by using this impulse response. However, when conference participants change their seats or the like, acoustic passes of the acoustic echo vary resulting in mismatch between studied impulse response and practical impulse response, and thus complete removal of the acoustic echo becomes impossible. In the worst case, residual echo repeatedly run around to gradually increase sound level, generates howling phenomenon, and provides a state that conversation is completely impossible to do.

Consequently, such a method has been proposed that aims at removing acoustic echo always and completely, by sequential learning of impulse response so as to follow variation of the acoustic passes (for example, see Peter Heitkamper, "An Adaptation Control for Acoustic Echo Cancellers", IEEE Signal Processing Letters, Vol. 4, No. 6, 1997/6).

In addition, a method for elimination of acoustic echo using microphone array has been proposed (for example, see JP-A-2005-136701). In conventional technology, because of insufficient performance of an echo canceller, in the case where a near end talker and a far end talker speak at the same time, howling is prevented by setting a one-way communication state by a complete shutout of a voice of a talker with low sound level. However, this one-way communication has a problem of difficulty in conversation.

Reference may be further made to R. O. Schmidt, "Multiple Emitter Location and Signal Parameter Estimation", IEEE Trans. Antennas and Propagation, Vol. 34, No. 3, pp. 276 to 280, 1986; and Masahito Togami, Akio Amano, Hiroshi Shinjo, Ryota Kamoshida, Junichi Tamamoto, Saku Egawa, "Auditory Ability of Human Symbiosis Robots "EMIEW"", JSAI Technical Report SIG-Challenge-0522-10 (10/14), pp 59 to 64, 2005.

SUMMARY OF THE INVENTION

In a conventional method for following variation of the acoustic paths by sequential learning on impulse response, sequential learning is possible to do in the case where sound is coming only from the speaker, however, in the case where a talker in a conference room is speaking as well as sound comes from the speaker, the learning becomes impossible to do, and resulting in, in the worst case, failure in the learning on impulse response and inability of complete removal of the acoustic echo. Accordingly, it is required to judge whether sound is coming only from the speaker, or a talker in a conference room is speaking (double talk detection).

In the present invention, adaptation control of an echo canceller is carried out by detection of a state that sound from the speaker is dominant. As a configuration example therefor, by using microphone array having a plurality of microphone elements, estimation of a coming direction of a sound source becomes possible. In more preferable embodiment, by detecting phase difference of voices input to a plurality of microphone elements, a state that a sound from a speaker is dominant can be judged. This judgment can be carried out by comparing with threshold value stored in advance. A further preferable embodiment has acoustic echo canceller adaptation unit, which extracts only a band splitting signal, where a coming direction of a sound source coincides a speaker direction, and carries out adaptation of the acoustic echo canceller, by the band splitting signal.

The acoustic echo canceller is capable of canceling echo by producing a pseudo sound from the speaker, and subtracting it from input voice.

A typical example of a configuration of the present invention is a conference system provided with a microphone for inputting a voice; an AD converter for digital-converting a signal from the microphone; an information processing apparatus for processing the digital signal from the AD converter to suppress acoustic echo components; an output interface for transmitting the signal from the information processing apparatus to a network; an input interface for receiving the signal from the network; a DA converter for analogue-converting the signal from the input interface; and a speaker for outputting the signal from the DA converter as a voice, wherein the information processing apparatus controls optimization timing of the information processing apparatus, based on a state of voice input to the microphone. The AD converter and the DA converter may be integrated in a one unit.

Preferably, optimization of the information processing apparatus is carried out in such timing that voice input to the microphone becomes mainly from a speaker direction. The judgment becomes possible by, for example, setting a suitable threshold value.

Further preferably, the information processing apparatus is provided with an adaptive filter, the acoustic echo canceller adaptation unit for carrying out optimization of the adaptive filter, and the acoustic echo canceling unit for suppressing acoustic echo components, which are mixed-in components of the speaker voice, from a digital signal, by using the adaptive filter.

Further preferably, the microphone is a microphone array having a plurality of microphone elements; the AD converter is a plurality of AD converters for digital converting a signal by each of the microphone elements; the information processing apparatus has a phase difference calculation unit for calculating phase difference between voices input to the plurality of microphone elements, based on the signal from the plurality of AD converters and has a frequency sorting unit for judging whether the voice input to the microphone array is voice from the speaker or not, based on phase difference, which the phase difference calculation unit outputs.

Further preferably, the information processing apparatus is provided with a band splitting (dividing) unit for band-splitting (band-dividing) the digital signals and said apparatus band-splits each of the digitally-converted digital signals by each of the microphone elements at the band splitting unit; the phase difference calculation unit calculates phase difference among the voices input to the plurality of microphone elements, by each of the above split bands; the frequency sorting unit judges whether the band splitting signal is a speaker output signal or a talker signal, based on phase difference by each of the bands, that the phase difference calculation unit outputs; the acoustic echo canceller adaptation unit carries out adaptation of an adaptive filter used to suppress commingled components of the speaker voice, from the signal of the microphone elements, only for a band judged to be a speaker output signal by the frequency sorting unit; and the acoustic echo canceling unit removes the acoustic echo components from the signal of each of the microphone elements, using the adaptive filter. In the band splitting unit, for example, a frequency of from 20 Hz to 16 kHz is split by steps of 20 Hz. In this way, by carrying out control by a frequency band, high precision echo canceling becomes possible.

Further preferably, in the frequency sorting unit, in order to judge whether a signal is the speaker output signal or not, a transfer function of a sound, which is transmitted from the speaker to the microphone array, is measured in advance; a phase difference of the microphone array by each of the bands, in outputting a sound from the speaker, is calculated from the transfer function measured; the phase difference by each of the bands is stored in an external storage; and in the case where the phase difference already stored and the phase difference among the microphone elements by each of the bands of the band splitting signal are equal to or smaller than a predetermined threshold value, the band splitting signal is judged to be the speaker output signal.

Further preferably, a user interface is provided, wherein a user specifies number of speakers, and a relative physical locations of the speakers to the microphone array in advance; an echo phase difference calculation processing unit is provided for calculating phase difference of the microphone array by each of the bands, in outputting a sound from the speakers, based on the number and the relative physical locations of the speakers, specified by the user interface; the phase difference by each of the bands is stored in an external storage; and in the case where the phase difference already stored and the phase difference among the microphone elements, by each of the bands of the band splitting signal, is equal to or smaller than the predetermined threshold value, the band splitting signal is judged to be the speaker output signal.

Further preferably, a histogram in a sound source direction over bands is calculated by using phase difference of each of the microphone array; a sound source assigned position unit is provided for estimating a sound source direction from the histogram; a level of a signal is calculated, that signal being estimated to have come from a sound source direction which the sound source assigned position unit calculated; and in the case where the signal level calculated is equal to or lower than a predetermined level, by comparing a level of the band splitting signal judged to be the speaker output signal, or a level of the band splitting signal judged to be the speaker output signal at the band splitting signal after the acoustic echo canceller, the levels of the band splitting signals are reduced or all set to zero.

According to the above configuration, control of the echo canceller can be carried out dynamically depending on a condition of a conference room.

Other objects, features and advantages of the invention will become apparent from the following description of the embodiments of the invention taken in conjunction with the accompanying drawings.

BRIEF DESCRIPTION OF THE DRAWINGS

FIG. 1 is a drawing showing a hardware configuration of the present invention.

FIG. 2 is a block diagram of software of the present invention.

FIG. 3 is a block diagram for specifying number and locations of speakers by GUI of the present invention.

FIG. 4 is a block diagram for VoiceSwitch switch processing by sound source assigned position of the present invention.

FIG. 5 is a total view of an apparatus where a TV conference system of the present invention is applied.

FIG. 20 is a flow diagram of suppression coefficient control of nonlinear acoustic echo suppression processing by each of frequencies, utilizing information similar to a sound source direction.

DESCRIPTION OF THE EMBODIMENTS

Figure 6:
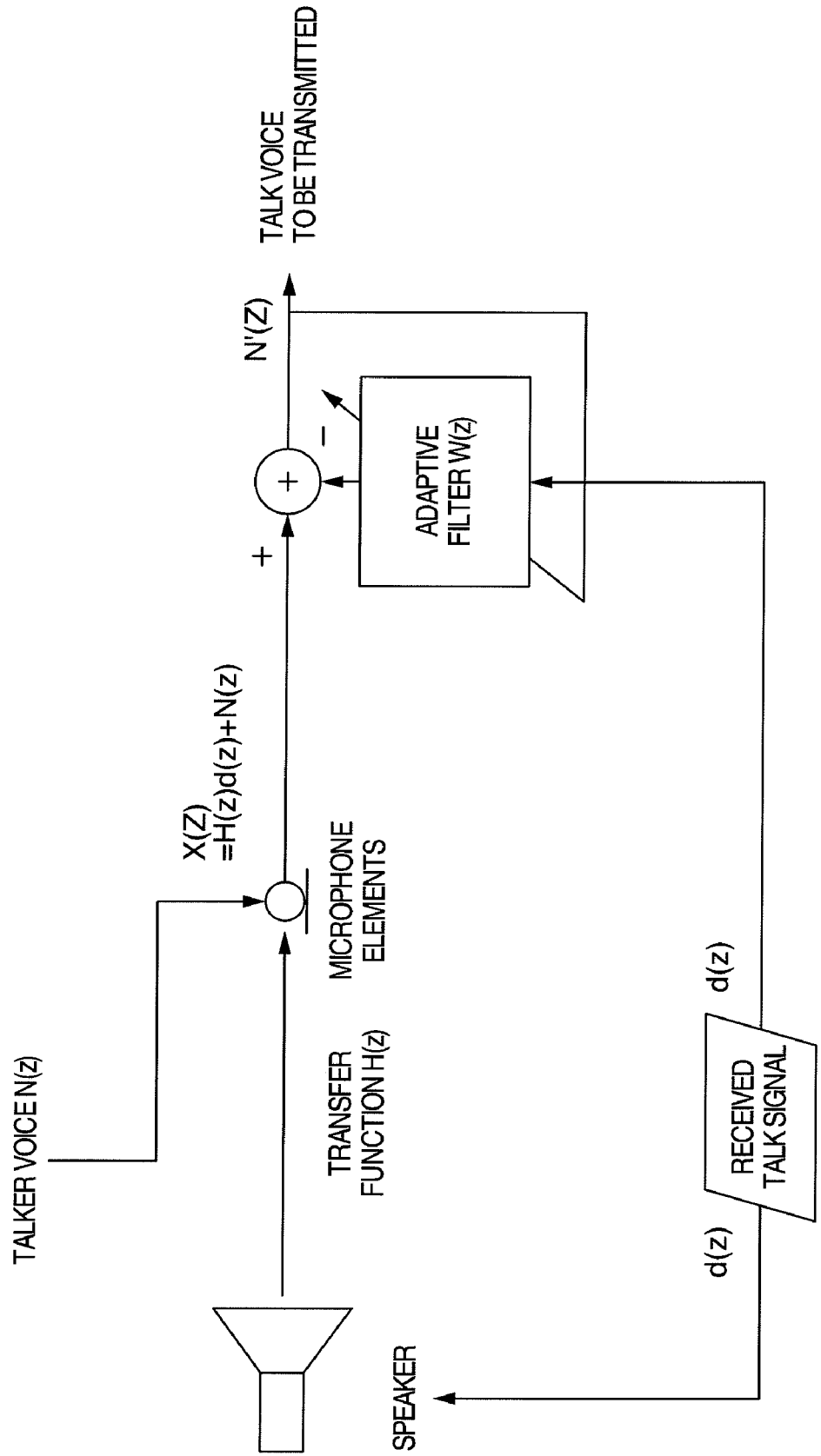
FIG. 6 is a drawing explaining an acoustic echo canceller of conventional technology.

Explanation will be given below on specific embodiments of the present invention with reference to drawings. The present invention is, for example, a telephone conference system using an IP network line, where both talkers at two (or more) sites connected by the network communicate using a telephone conference apparatus configured by microphone array and speakers and the like, and thus conversation between talkers at both sites is attained. Hereafter, both talkers at these sites are referred to as a near end and a far end.

FIG. 1 is a drawing showing a hardware configuration of the present invention, each arranged at the near end and the far end. This hardware is configured by a microphone array 1 configured by at least two or more microphone elements, an A/D and D/A converter 2 for converting analogue sound pressure value input from the microphone array to a digital data and for converting the digital data to the analogue data, respectively, a CPU 3 for processing output of the converter 2, a volatile memory 4 of, for example, volatile type, a hub 5 for transmitting and receiving data between the near end and the far end, a loud speaker 6 for converting the D/A converted analogue data to sound pressure through the speaker and an external storage medium 7 of, for example, nonvolatile type.

Sound pressure value of multi-channels, recorded by the microphone array 1 is transmitted to the AD/DA converter 2, and converted to the digital data of the multi-channels. Thus converted digital data is accumulated in the memory 4 via the CPU 3.

A voice of the far end transmitted via the hub 5 is transmitted to the AD/DA converter 2 via the CPU 3, and output from the speaker 6. The voice of the far end output from the speaker 6 commingles to a voice recorded by the microphone array 1, with voice of a talker at the near end. Therefore, also in a digital sound pressure data accumulated in the memory 4, the voice of the far end output from the speaker commingles. The CPU 3 carries out echo canceling processing to suppress the voice of the far end commingled, from the digital sound pressure data accumulated in the memory 4, and transmits only the voice of a talker at the near end to the far end via the hub 5. The echo canceling processing suppresses the voice at the far end, by utilization of information on such as data of a sound transmission way from the speaker to the microphone array, which is stored in advance in the external storage medium 7, or speaker number and speaker locations or the like.

FIG. 2 is a drawing showing a software configuration of the present invention, and all the works are carried out by the CPU 3 in a digital way, except the work by the A/D converter 8 for converting an analogue data to a digital data. This is the most convenient system as long as processing capability of the CPU is sufficient. Alternatively, a hardware configuration equivalent thereto may be adopted to carry out digital or analogue processing.

Major functional blocks are configured by 9: the band splitting unit for converting the digital data to the band-split data, 10: the phase difference calculation unit for calculating phase difference of the band-splitting signals among each of the microphone channels, 11: the frequency sorting unit for judging whether the acoustic echo is dominant or the talker voice is dominant, by each band of the band-splitting signals, 12: the acoustic echo canceller adaptation unit for adaptation of the adaptive filter for acoustic echo canceling, 13: the pseudo echo generation unit for artificial generation of the acoustic echo transmitted to the microphone array from speaker reference signals, and 14: the acoustic echo canceling unit for suppressing the acoustic echo from the input signal, using the adaptive filter or the like. The analogue sound pressure data of the multi-channels recorded by the microphone array 1 is converted to a digital data x(t) of the multi-channels by the A/D converter 8. The converted digital data of the multi-channels is transmitted to the band splitting unit 9, and converted to band splitting data x(f:τ) of the multi-channels. Here, because the microphone array are provided with a plurality of the microphone elements, the A/D converter 8 and the band splitting unit 9 may be arranged in parallel by number of the microphone elements.

In band splitting, short time Fourier transformation or wavelet transformation, a band bus filter or the like is used. In the band splitting unit, for example, a frequency of from 20 Hz to 20 kHz is split by 20 Hz. "τ" is a frame index in carrying out short time frequency analysis. The band splitting data is transmitted to the phase difference calculation unit 10. In 10: the phase difference calculation unit, phase difference by each of the microphone channels is calculated using equation 1.

$$\delta_{i,j}(f, \tau) = \arg \frac{x_j(f, \tau)}{x_i(f, \tau)} \quad \text{Equation 1}$$

wherein xi(f, τ) is the f-th band splitting data of the i channel. Similarly, xj(f, τ) is the f-th band splitting data of the j channel. "δi,j (f, τ)" is phase difference relating to the f-th bands of the i channel and the j channel. Thus calculated phase difference by each of the microphone channels is transmitted to the frequency sorting unit 11. In the frequency sorting unit 11, ei,j(f, τ) defined by equation 2, are calculated from phase difference Spi,j(f) of the echo components from the speaker to the microphone array, which are set in advance, and phase difference by each of the microphone channels, and in the case where sum of the ei,j(f, τ) relating to index i, j is equal to or smaller than a threshold value set in advance, the f-th band is judged to be a band where echo is dominant, whereas, in the case where sum of the ei,j(f, τ) relating to index i, j is equal to or larger than the threshold value set in advance, it is judged to be a voice of a near end.

$$e_{i,j}(f) = |Sp_{i,j}(f,\tau) - \delta_{i,j}(f,\tau)|^2 \quad \text{Equation 2}$$

Frequency components judged to be the echo is transmitted to the acoustic echo canceller adaptation unit 12. In the acoustic echo canceller adaptation unit 12, setting conditions of an adaptive filter by a split frequency is stored. In the acoustic echo canceller adaptation unit 12, adaptation of an adaptive filter hi, τ(f, T) is carried out according to equation 3, using pseudo echo components, Echo i(f, τ), which the pseudo echo generation unit 13 outputs, on the frequency bands judged to be the echo by the frequency sorting unit 11.

$$h_{i,\tau+1}(f, T) = h_{i,\tau}(f, T) + \frac{2\alpha(x_i(f, \tau) - Echo_i(f, \tau))d(f, \tau-T)}{\sum_{T=0}^{L} |x_i(f, \tau-T)|^2} \quad \text{Equation 3}$$

The Echo i(f, τ) are pseudo echo components of the i-th channel microphone. The hi, τ(f, T) is the T– the tap filter of the f-th band of the adaptive filter of the i-th channel, and the already adaptive filter in the signals to a τ–1 frame. L is tap length of the adaptive filter. The adaptation may be carried out, in this way, by each of the frequencies, or may be carried out, in the case where band number judged to be the speaker direction is equal to or larger than predetermined threshold value, in a time τ, in all frequency components of the time τ, by equation 3. In addition, sound source assigned position by each of the frequencies may be carried out, based on a MUSIC method (reference may be made to R. O. Schmidt, "Multiple Emitter Location and Signal Parameter Estimation", IEEE Trans. Antennas and Propagation, Vol. 34, No. 3, pp. 276 to 280, 1986) or a modified delay summation array method (reference may be made to Masato Togami, Akio Amano, Hiroshi Shinjo, Ryota Kamoshita, Ryouichi Tamamoto, Motomu Egawa, "Auditory Ability of Human Symbiosis Robots, "EMIEW"", JSAI Technical Report SIG-Challenge-0522-10(10/14), pp 59 to 64, 2005). In the pseudo echo generation unit 13, pseudo echo components eˆ(f, τ) defined by equation 4 is generated.

$$Echo_i(f, \tau) = \sum_{T=0}^{L} h_{i,T}(f, T)d(f, \tau - T) \quad \text{Equation 4}$$

wherein d(f, τ) is a band splitting signal of an original signal to be output to the speaker. Furthermore, in the pseudo echo generation unit 13, an echo phase difference DB is updated by equation 5, from the pseudo echo.

$$Sp_{i,j}(f) = \arg\frac{Echo_j(f, \tau)}{Echo_i(f, \tau)} \quad \text{Equation 5}$$

Phase difference between microphones of the adaptive filter is stored in the echo phase difference DB. In the acoustic echo canceling unit 14, the voice digital data x̂i(f, τ) after acoustic echo suppression is generated by equation 6, using an adaptive filter, which is adapted by the acoustic echo canceller adaptation unit 12, and output.

$$\hat{x}_i(f,\tau) = x_i(f,\tau) - Echo_i(f,\tau) \quad \text{Equation 6}$$

As described above, in the present invention, by judging a band where speaker sound is dominant, from phase difference between microphones, using microphone array having a plurality of microphone elements, so as to carry out adaptation control only for that band, a filter with high suppression performance of the acoustic echo can be generated. In addition, because double talk detection becomes possible, it is possible to carry out adaptation of the acoustic echo canceller in timing when sound is coming only from the speaker. Accordingly, because not only variation of acoustic paths can be always followed but also, in the case where a talker in a conference room speaks when a sound is coming out from the speaker, learning on impulse response is temporarily stopped, failure of learning on impulse response becomes rare.

FIG. 3 is a block diagram of a system for setting initial values of the echo phase difference DB, by using information of GUI for specifying speaker number and locations. This system is configured by 15: the speaker number and locations setting GUI for specifying the number and the physical locations of the speakers used in TV conference; and each of functional blocks and data base of 16: the echo phase difference calculation processing unit for calculating phase difference of acoustic echo from the number and the physical locations of the speakers set; and is realized by the CPU and the storage unit.

In the speaker number and locations setting GUI 15, the number of the speakers, and the locations of the speakers relative to the microphone array 1 are set. In the speaker number and locations setting GUI 15, it is essential to set a speaker direction to the microphone array 1, and information on the number and the locations of the speakers set by the speaker number and locations setting GUI 15, is transmitted to the echo phase difference calculation processing unit 16. In the echo phase difference calculation processing unit 16, phase difference Sp i,j(f) of the acoustic echo between microphones of the i-th channel and the j-th channel is estimated from the number and the locations of the speakers, based on FarField hypothesis. Thus estimated echo phase difference is stored in the echo phase difference DB.

In FIG. 4, by switching whether the echo canceller is used or a voice switch is used, using adaptation algorism of the present invention and a sound source direction, it is possible to realize a TV conference system without generation of howling, even in a large scale conference room, wherein performance of the echo canceller is beyond the capability. This system is provided with, in addition to the voice echo canceling unit 14; 17: the sound source assigned position unit for estimating a voice power of a talker; 18: the VoiceSwitch judging unit for judging whether the VoiceSwitch is used or not, based on level of the acoustic echo and level of the voice power of a talker; and 19: the output signal generation unit for outputting a signal after acoustic echo suppression.

As for the A/D converting unit, the band splitting unit, the phase difference calculation unit, the frequency sorting unit, the acoustic echo canceller adaptation unit, the pseudo echo generation unit, and the acoustic echo canceling unit, processing thereof is similar as in FIG. 2. In the sound source assigned position unit 17, a histogram of phase difference of frequency components, which are not judged to be the echo components by the frequency sorting unit 11, is calculated, and from the peaks of the calculated phase difference histogram, a sound source direction is identified. The sound source direction to be identified may be determined in advance, or the peak of the histogram may be judged as the sound source direction, in the case where frequency thereof is equal to or more than a certain threshold value. As for thus identified sound source direction, one added with whole power is defined as a power of a near end talker. In the sound source assigned position unit 17, the power of the near end talker is output. In the VoiceSwitch judgment unit 18, sum of the power after acoustic echo canceling, on the frequency judged that acoustic echo is dominant by the frequency sorting unit, is calculated as an acoustic echo power. When ratio of the calculated acoustic echo power and the power of the near end talker is equal to or larger than the predetermined threshold value, the frame is judged that acoustic echo is dominant, and there is no talker present, and use of the VoiceSwitch is judged. In addition, when the ratio is equal to or smaller than predetermined threshold value, it is judged that a talker is present in the frame, and no use of the VoiceSwitch is judged. In the output signal generation unit 19, in the case where it is judged that VoiceSwitch is used, a signal having all values set to 0 is generated and output. In the case where it is judged that VoiceSwitch is not used, a signal after acoustic echo canceling, which the acoustic echo canceling unit outputs, is output. In the case where there are many residual echo in the signal after acoustic echo canceling, the VoiceSwitch judging unit 18 judges that VoiceSwitch is used, and a signal containing the residual echo is set not to be transmitted. Transmitting the signal containing the residual echo makes a system to a closed-loop, and provides generation risk of howling caused by the residual echo. Therefore, it is desired to use VoiceSwitch to prevent the residual echo so that the echo does not move in a loop way, however, use of VoiceSwitch always makes impossible for a near end talker and a far end talker to exchange conversation at the same time. Accordingly, in the VoiceSwitch judging unit 18 of the present invention, because VoiceSwitch is used only in a frame where the residual echo is present, it is possible for a near end talker and a far end talker to exchange conversation at the same time, when the residual echo is not generated. In addition, because the system is switched to VoiceSwitch in the case where the residual echo is generated, possibility of howling generation can be reduced dramatically. In the present embodiment, the acoustic echo power used for judging by the VoiceSwitch judging unit 18 was determined from a signal after acoustic echo canceling, however, the acoustic echo power may be calculated from the power of a signal before acoustic echo canceling.

In addition, use of VoiceSwitch is judged by comparing residual echo of all frequencies and power of a near end talker of all frequencies, however, whether VoiceSwitch is used or not may be switched by each of the sub-bands, by comparing residual echo and the power of the near end talker. In this case, the sub-band, where VoiceSwitch is judged to be used by each of the sub-bands, outputs one substituted with a value of 0 by the output signal generation unit 19. The sub-band, where VoiceSwitch is judged not to be used, outputs a signal after acoustic echo canceling by the output signal generation unit 19.

FIG. 5 shows a total system view where the present invention is applied to a TV conference system. This system is a TV conference system characterized by controlling adaptation of the acoustic echo canceller on a computer 101, by using information on phase difference calculated by the phase difference calculation unit 10, or a sound source direction.

FIG. 5 shows a configuration of one-site system. A TV conference system 100 carries out acoustic signal processing or image processing, communication processing by the computer 101. An A/D and D/A converter 102 is connected to the computer 101, and a voice signal recorded by a microphone arrays 105 is converted to a digital voice signal by the A/D and D/A converter 102, and transmitted to the computer 101. The microphone arrays 105 have a plurality of microphone elements.

In the computer 101, the digital voice signal is subjected to acoustic signal processing, and the voice signal after the processing is transmitted to a network via a hub 103. Here, the computer 101 is provided with the CPU 3, the memory 4 and the external storage medium 7, shown in FIG. 1.

Figure 9:
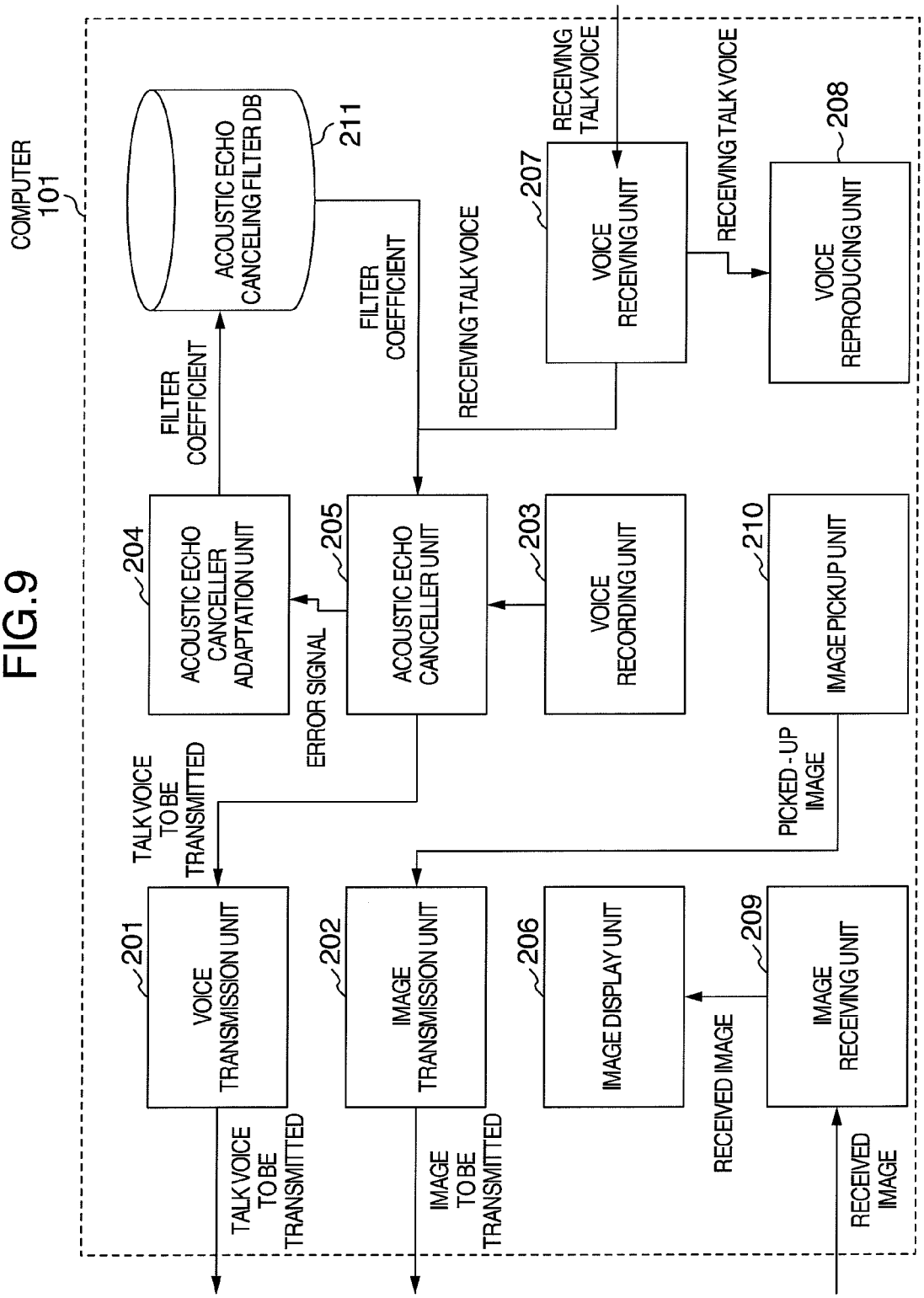
FIG. 9 is a block diagram of a TV conference system where the present invention is applied.

The external storage medium 7 may be present inside the computer 101, or may be present outside the computer 101. Here, the CPU 3 inside the computer 101 has, as shown in FIG. 2, the band splitting unit 9, the phase difference calculation unit, 10, the frequency sorting unit 11, the acoustic echo canceller adaptation unit 12, the pseudo echo generation unit 13, the acoustic echo canceller unit 14, or as shown in FIG. 9 to be described later, a voice transmission unit 201, an acoustic echo canceller adaptation unit 204, an acoustic echo canceller unit 205, a voice recording unit 203, a voice receiving unit 207, and a voice reproducing unit 208, and the acoustic echo canceller is realized by these units.

An image signal of the other-sites transmitted to the TV conference system 100 via the hub 103 is transmitted to the image display apparatus 104 to be displayed at a screen. The voice signal of the other-sites transmitted via the hub 103 is output from the speaker 106.

In a voice received by the microphone arrays 105, acoustic echo is included, which are transmitted from the speaker 106 to the microphone arrays 105, and it is necessary to remove these echo. A digital cable 110 and the digital cable 113, the USB cable and the like are used.

FIG. 6 shows a configuration of acoustic echo suppression processing of conventional technology, by an acoustic echo model on sound transmission from the speaker to the microphone elements, and an acoustic echo canceller using an adaptive filter.

All of the signals are expressed after z transformation. The received talk signal d(z) comes in a form where impulse response H(z) of a room is convoluted onto the microphone elements emitted from the speaker. The impulse response H(z) contains direct sound from the speaker to the microphone, and reflection (acoustic echo) from a wall, a floor, a ceiling or the like.

In microphone elements, not only acoustic echo but also a voice of a talker N(z) are mixed. Transmission of the microphone element signal X(z) as it is provides loop-like signal, due to containing acoustic echo in a voice to be transmitted, and in the worst case, generates howling and communication inability. Therefore, it is necessary to suppress only acoustic echo from the voice to be transmitted.

The adaptive filter W(z) is a filter that studied impulse response H(z) of a room in a adaptation way, and is capable of preparing pseudo acoustic echo, by multiplying W(z) on a received talk signal. Adaptation of the adaptive filter W(z) is carried out by using, for example, an NLMS method or the like. In the NLMS method, an adaptive filter is updated like $W(z)=W(z)+2\,\mu X(z)N'(z)^*/|X(z)|^2$.

In the case of W(z)=H(z), by subtracting the pseudo acoustic echo from a microphone signal, only a voice of a talker, N(z), can be extracted.

In the case of N(z)=0 and W(z)=H(z), a voice to be transmitted becomes 0. Namely, in the update equation in the above NLMS method, W(z) is changed in an adaptation way, so that voice to be transmitted becomes 0.

However, in the case where N(z) is not 0, by change of W(z) in an adaptation way, so that a voice to be transmitted becomes 0, adaptation of W(z) fails inversely. Therefore, it is necessary to control, in the case where N(z) is not 0, so as not to adapt.

Figure 7:
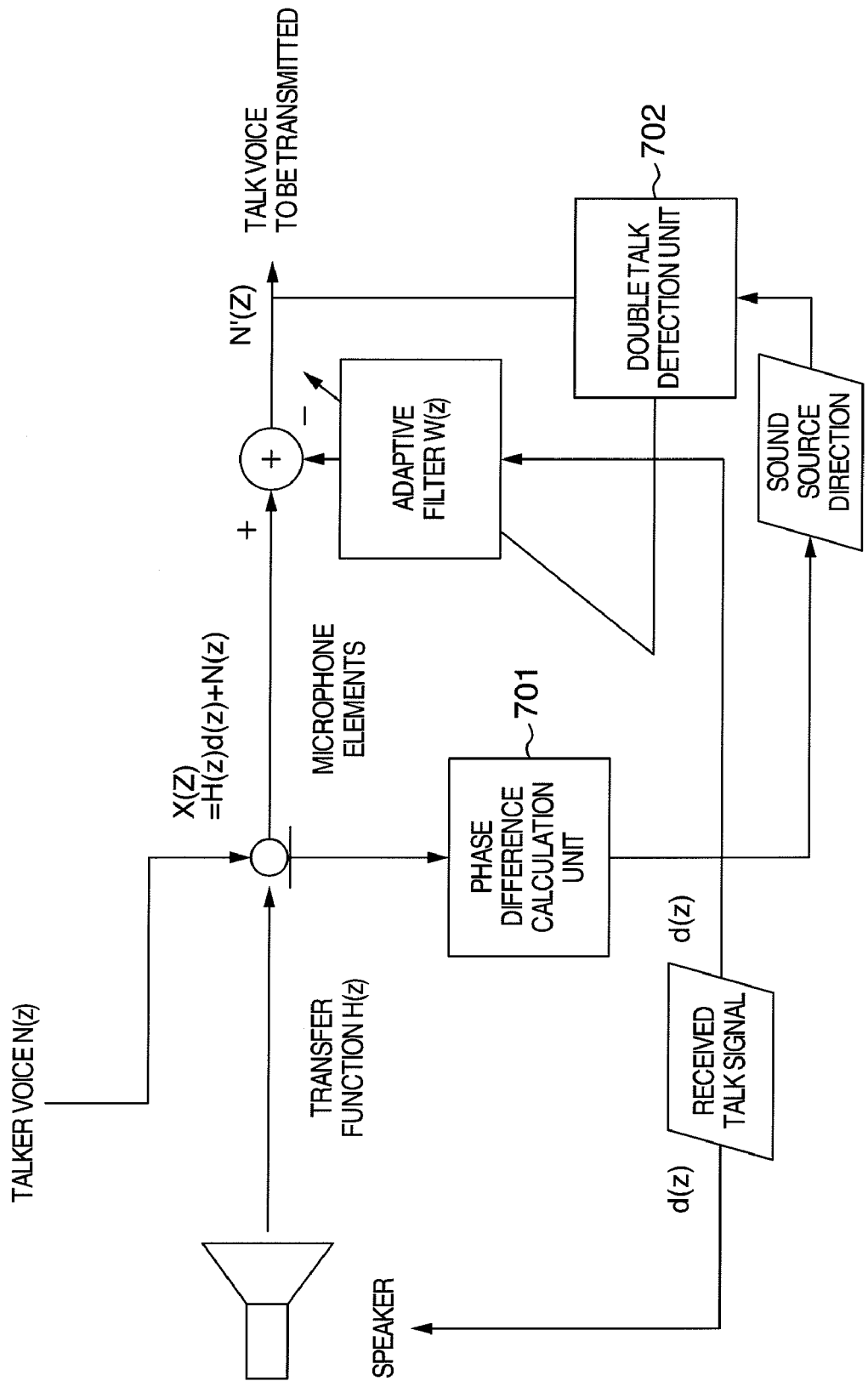
FIG. 7 is a drawing explaining an acoustic echo canceller using double talk detection processing.

FIG. 7 shows a system where the present invention is applied, having a double talk detector provided with control function so as not to adapt, in the case where N(z) is not 0. This double talk detector judges whether N(z) is 0 or not, and adapts a adaptive filter only when N(z) is nearly 0.

This system where the present invention is applied features in that the double talk detector unit 702 carries out judgment by utilization of information on a coming direction of a sound source, obtained by the phase difference calculation unit 701.

Because updating of the acoustic echo canceller, in the case where N(z) is not 0, leads to adaptation failure, and provides a risk of divergence of a filter, the double talk detector is essential to avoid the risk.

Figure 8:
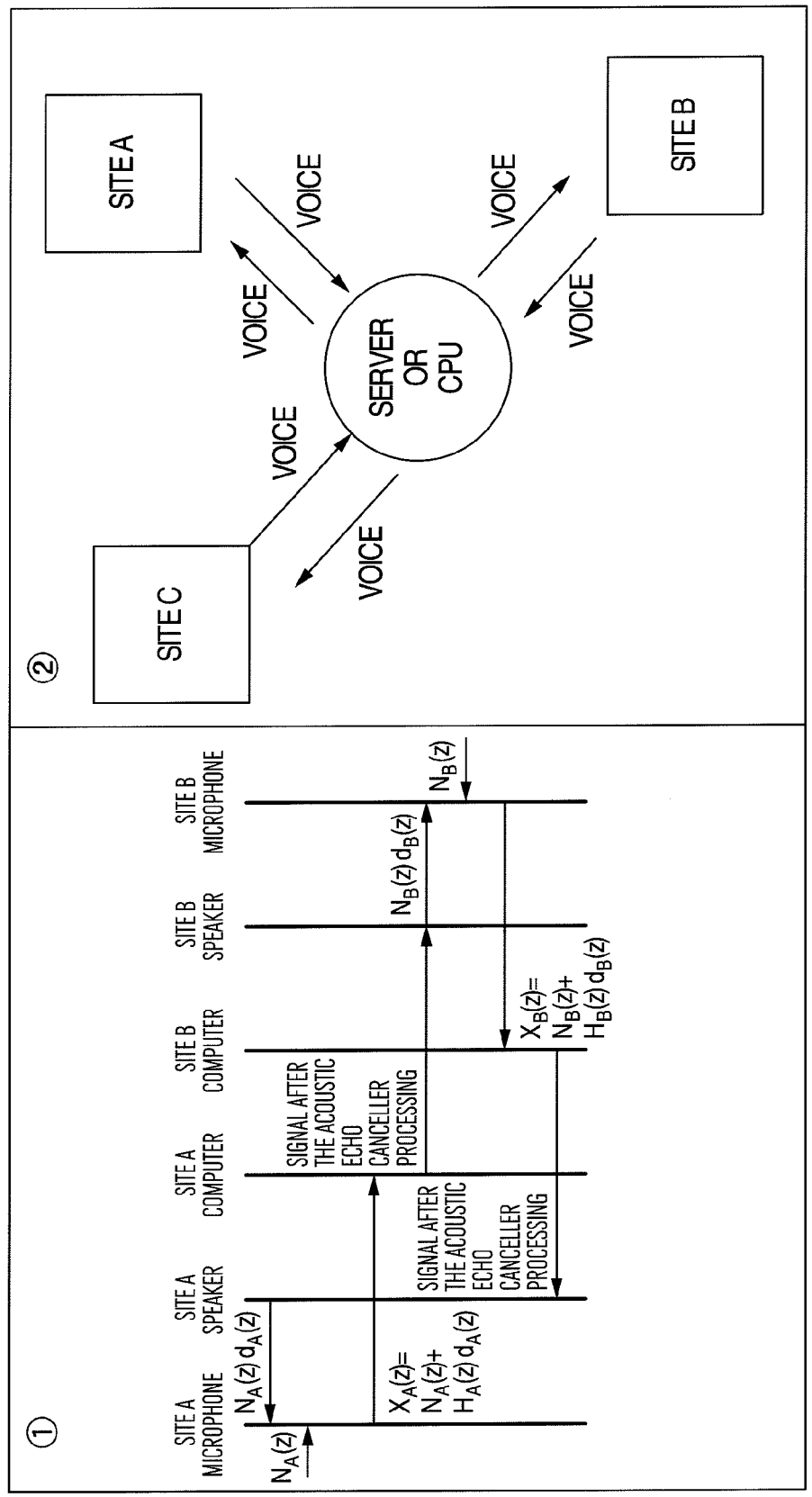
FIG. 8 is a drawing showing a configuration of a 2-sites TV conference.

FIG. 8 shows flow of voice stream in a 2-sites TV conference system, and flow of voice stream in a 3 or more-sites TV conference system. Here, the phase difference calculation unit may be present in a server, or may be present in a CPU at each of the sites.

In the case of 2-sites conference, a talk signal after acoustic echo canceling, to be transmitted from a TV conference system at a site A is transmitted to a TV conference system at a site B via a network, and reproduced at the site B, while voice of the site B is transmitted to the site A and reproduced there.

In the case of 3 or more-sites conference, data is once collected in the server or the CPU, and then re-distributed to and reproduced at each of the sites.

FIG. 9 shows a block configuration of a TV conference system where the present invention is applied. Received talk voice transmitted via the network is received by a voice receiving unit 207. Thus received talk voice is transmitted to a voice reproducing unit 208. In the voice reproducing unit 208, the received talk voice is reproduced by the speaker.

The received talk voice is transmitted to an acoustic echo canceller unit 205. In a voice recording unit 203, a voice signal of the microphone array is recorded. Thus recorded voice signal is transmitted to the acoustic echo canceller unit 205.

In the acoustic echo canceller unit 205, pseudo echo is generated from an acoustic echo canceling filter accumulated in an acoustic echo canceling filter DB 211 and the received talk voice, and the pseudo echo is subtracted from the voice signal of the microphone array. The error signal left as the result of the subtraction is transmitted to an acoustic echo canceller adaptation unit 204.

In the acoustic echo canceller adaptation unit 204, the acoustic echo canceller is adapted so as to set the error signal to 0. The adaptation result is stored in the acoustic echo canceling filter DB 211. The error signal output by the acoustic echo canceling unit 205 is transmitted to a voice transmission unit 201.

In the voice transmission unit 201, the error signal is transmitted to other sites. By an image pickup unit 210, an image is picked up by a camera, and the picked-up image is transmitted to an image transmission unit 202, and is transmitted to other sites.

In an image receiving unit 209, the image transmitted from other sites is received. Thus received image is transmitted to an image display unit 206. In the image display unit 206, the image transmitted is displayed on a screen.

Figure 10:
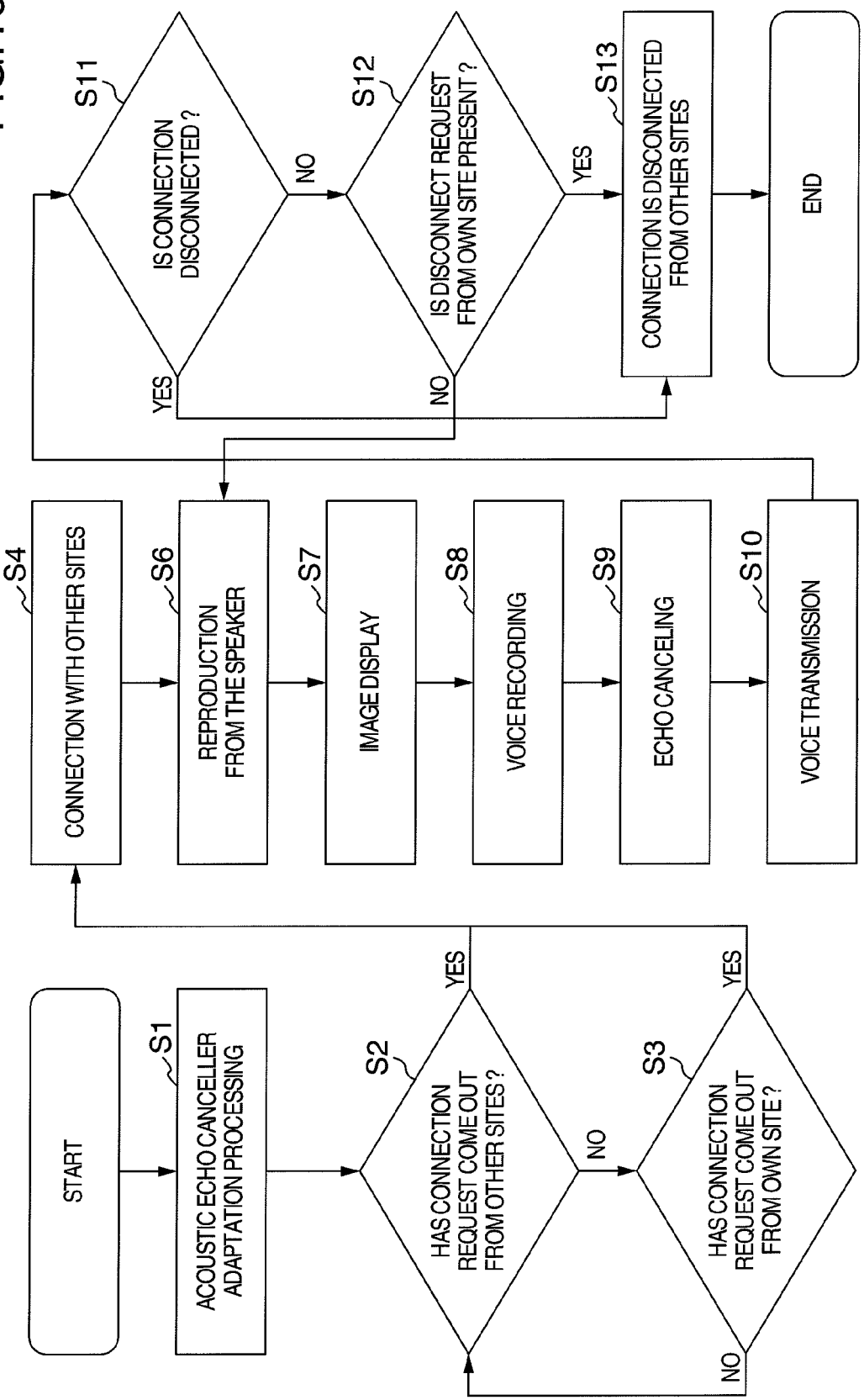
FIG. 10 is a process flow diagram of a TV conference system where the present invention is applied.

FIG. 10 shows a process flow of a TV conference system. In acoustic echo canceller adaptation processing S1, a learning signal is provided by the speaker to carry out adaptation of the acoustic echo canceller. The learning signal is desirably a white noise. A length (duration) of the learning signal is desirably from several seconds to equal to or longer than several-ten seconds. In the case where the length of the learning signal is short, the acoustic echo canceller could learn the impulse response in a room only insufficiently. In this way, by setting the length of the learning signal from several seconds to equal to or longer than several-ten seconds, sufficient learning on the impulse response becomes possible.

After completion of the learning, judgment S2 on whether a connection request from other sites is present or not, is carried out. In the case where the connection request from other sites is present, the connection S4 with other sites is carried out.

In the case where the connection request from other sites is absent, judgment S3 on whether a connection request from the own site is present or not, is carried out. The connection request from the own site is made by a user through GUI.

In the case where the connection request from the own site is present, the connection with other sites S4 is carried out. In the case where the connection request from the own site is absent, connection with other sites is not carried out, and returns to the judgment S2 on whether a connection request from other sites is present or not.

Namely, the TV conference system results in waiting until the connection request is present from any of the own site or other sites.

After the connection with other sites S4, reproduction from the speaker S6, image display S7, voice recording S8, echo canceling S9 and voice transmission S10 are repeated until the connection becomes disconnected.

In the reproduction S6 from the speaker, received talk voice transmitted from other sites is reproduced.

In the image display S7, the image transmitted from other sites is displayed on a monitor.

In the voice recording S8, the voice of the microphone array at the own site is recorded.

In the echo canceling S9, the echo components are suppressed from the voice of the microphone array recorded.

In the voice transmission S10, the voice signal after suppression of the echo components is transmitted. In judgment S11 on whether connection is disconnected, in the case where the connection is judged disconnected, disconnection S13 from other sites is carried out to terminate the TV conference system.

In the case where the connection is judged not disconnected, judgment S12 on whether a disconnect request from a user of the own site is present or not through GUI, is carried out, and when the disconnect request is present, the disconnection S13 from other sites is carried out to terminate the TV conference system.

Figure 11:
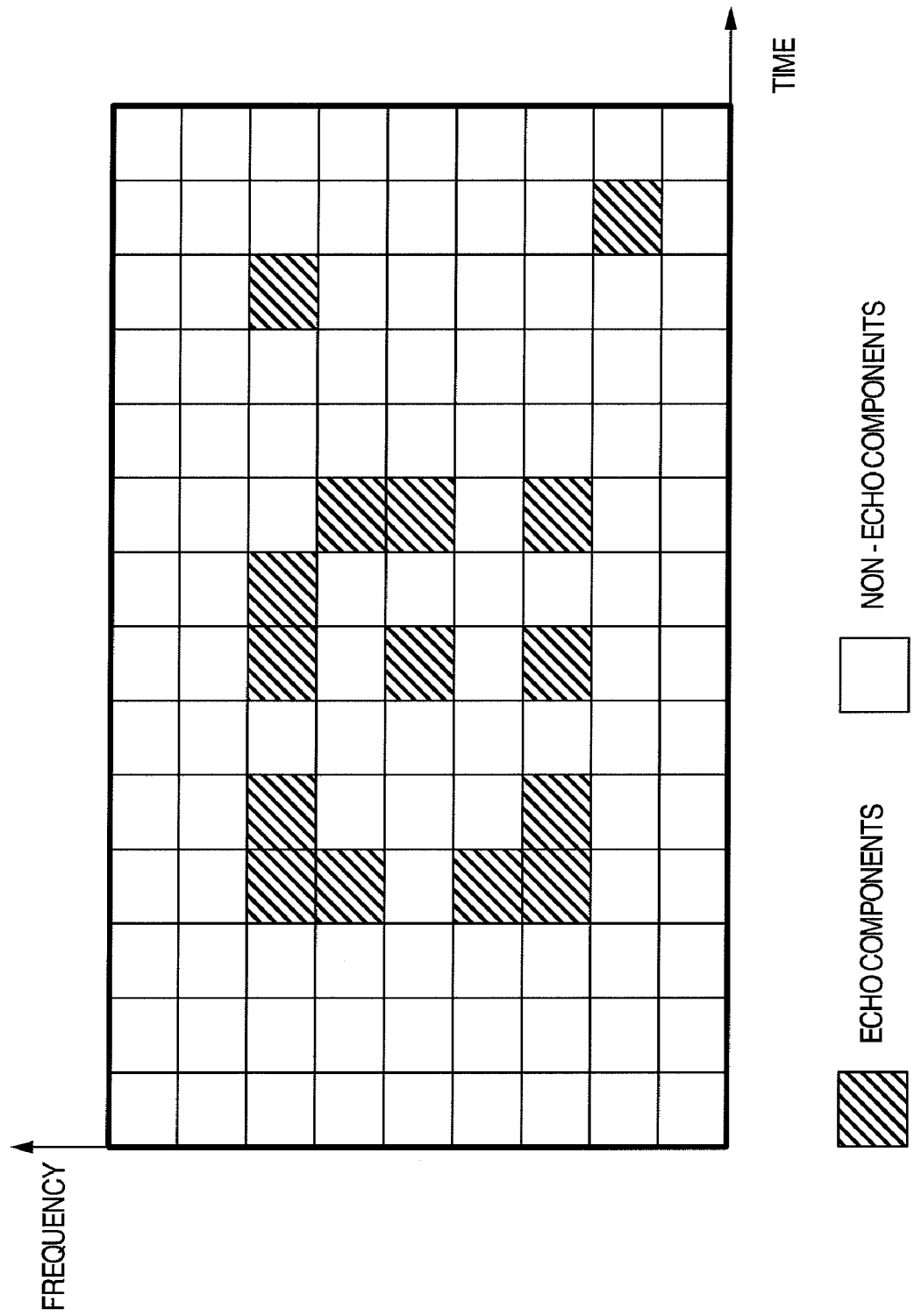
FIG. 11 is a drawing explaining a method for specifying acoustic echo components in the present invention.

FIG. 11 shows sparse property, which is fundamental concept of double talk processing, as a major element of the present invention.

In the present invention, the voice signal from the microphone array, and the received signal used in generation of the pseudo echo is all subjected to a short time Fourier transformation or a wavelet transformation or a sub-band processing, to be converted to a frequency band signal. A frame size in the short time Fourier transformation is desirably a point number equivalent to about 50 ms.

For example, in a sampling rate of 32 kHz, the frame size is desirably 2048 points. A voice is normally about several-ten ms, and by setting such a frame size, it can be presumed that maximal sparse property is attained in the frequency band, and high precision operation of adaptation processing of the acoustic echo canceller becomes possible.

In addition, the short time Fourier transformation is desirably carried out after applying a hamming window, Hanning window, or Blackman window or the like. The short time Fourier transformation assumes that a signal is repeated in an analysis length cycle. In the case where a window function is not applied, difference in values at both sites is generated, which causes observation of frequency otherwise not present after the short time Fourier transformation. On the other hand, by applying the window function in this way, frequency components not present becomes not observed, and improvement of frequency analysis precision becomes possible.

The frame sift is desirably about ¼ or ⅛ of the frame size, and the smaller frame sift more improves voice quality of an output voice. However, because the smaller frame sift requires increased processing amount, it is necessary to select smaller frame sift within such a range as real time processing is possible in processing speed of a computer to be mounted.

FIG. 11 shows a lattice, by setting the horizontal axis to be time (frame number), and the vertical axis to be frequency (frequency bin number).

In double talk processing of the present invention, whether said components are acoustic echo components or non-acoustic echo components is judged by each of time-frequency components, and adaptation processing of the acoustic echo canceller is carried out only for the time-frequency judged to be the acoustic echo components.

A voice, when viewed in the time-frequency band, is a sparse signal, and it is known that commingling of a plurality of voices on the same time-frequency is rare.

In the case where both of a received talk signal and a talk signal to be transmitted are voice signals, like the TV conference system, by sorting to either acoustic echo components or non-acoustic echo components, by each time-frequency, based on sparse property, extraction of only the acoustic echo components in high precision becomes possible.

Figure 12:
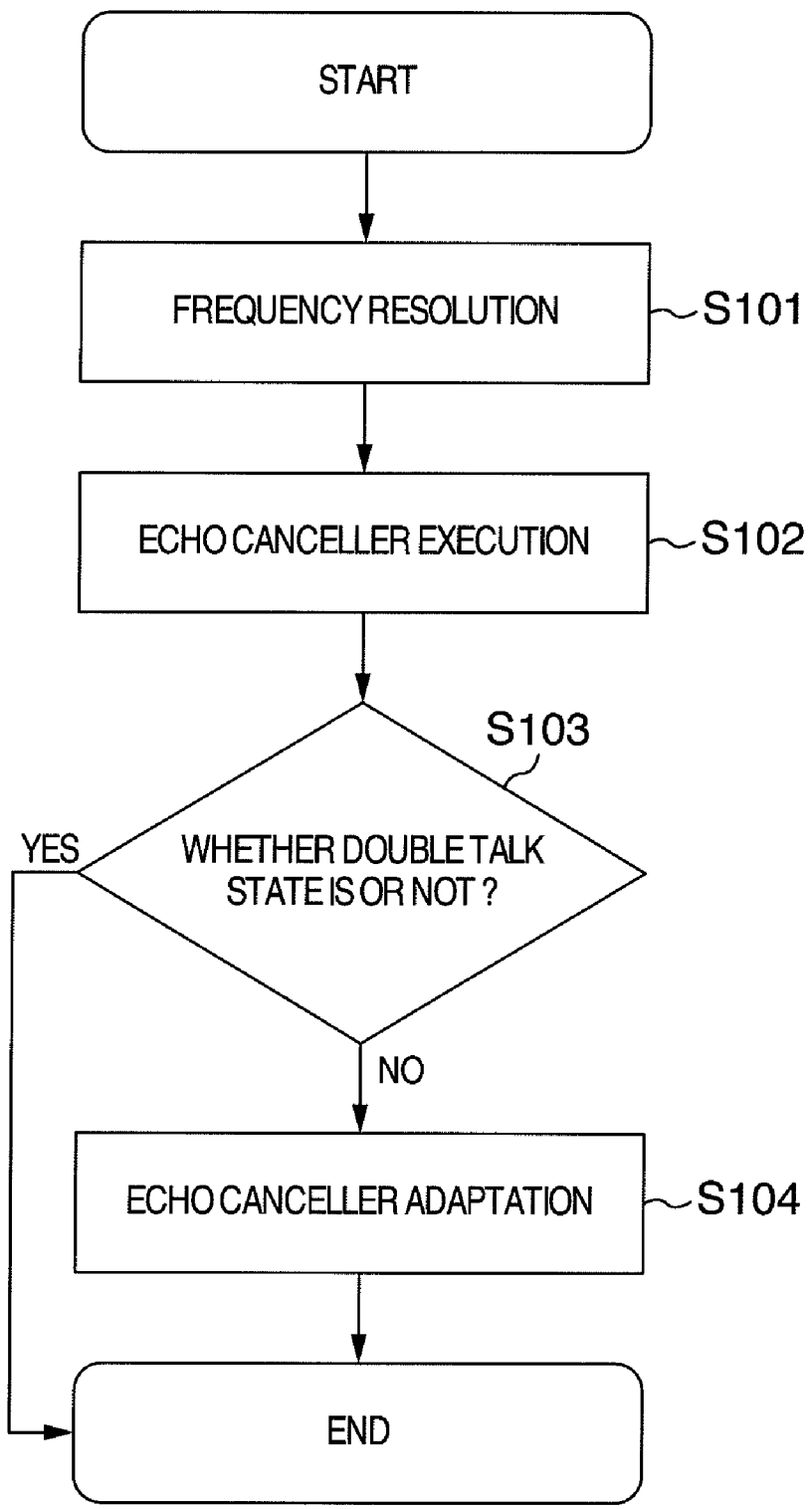
FIG. 12 is a process flow diagram of an echo canceller, double talk judgment and echo canceller adaptation processing of the present invention.

FIG. 12 shows a fundamental configuration of the acoustic echo canceller, where the present invention is applied.

First of all, for a voice signal input from the microphone array having a plurality of microphone elements to the computer 101, the band splitting unit carries out frequency resolution S101, to convert the recorded voice to the frequency band signal.

Then, the phase difference calculation unit calculates phase difference between elements of the recorded voice.

Subsequently, the frequency sorting unit judges "to which voice the band splitting signal belongs", based on phase difference of each of the bands that the phase difference calculation unit outputs. Namely, whether a speaker output signal or a talker signal is judged.

Then the acoustic echo canceller unit carries out removal S102 of a voice contained in the band splitting signal.

In S102, W(z) is multiplied to the reference signal d(z) to generate a pseudo echo W(z)d(z). By subtraction of W(z)d(z) from a microphone input signal x(x), the acoustic echo can be eliminated from the microphone input signal.

In the case where a speaker output signal components dominate among the band splitting signals, the acoustic echo canceller adaptation unit carries out judgment S103 to be a double talk state, and carries out adaptation processing S104 of the acoustic echo canceller.

The adaptation processing of the acoustic echo canceller updates the filter W(z) of the acoustic echo canceller by the NLMS method or the like. In the NLMS method, the update is carried out in a way of $W(z)=W(z)+2\mu X(z)N'(z)*/|X(z)|^2$.

In a double talk state, the echo canceller adaptation S103 is not carried out, and the acoustic echo canceller processing is terminated.

Figure 13:
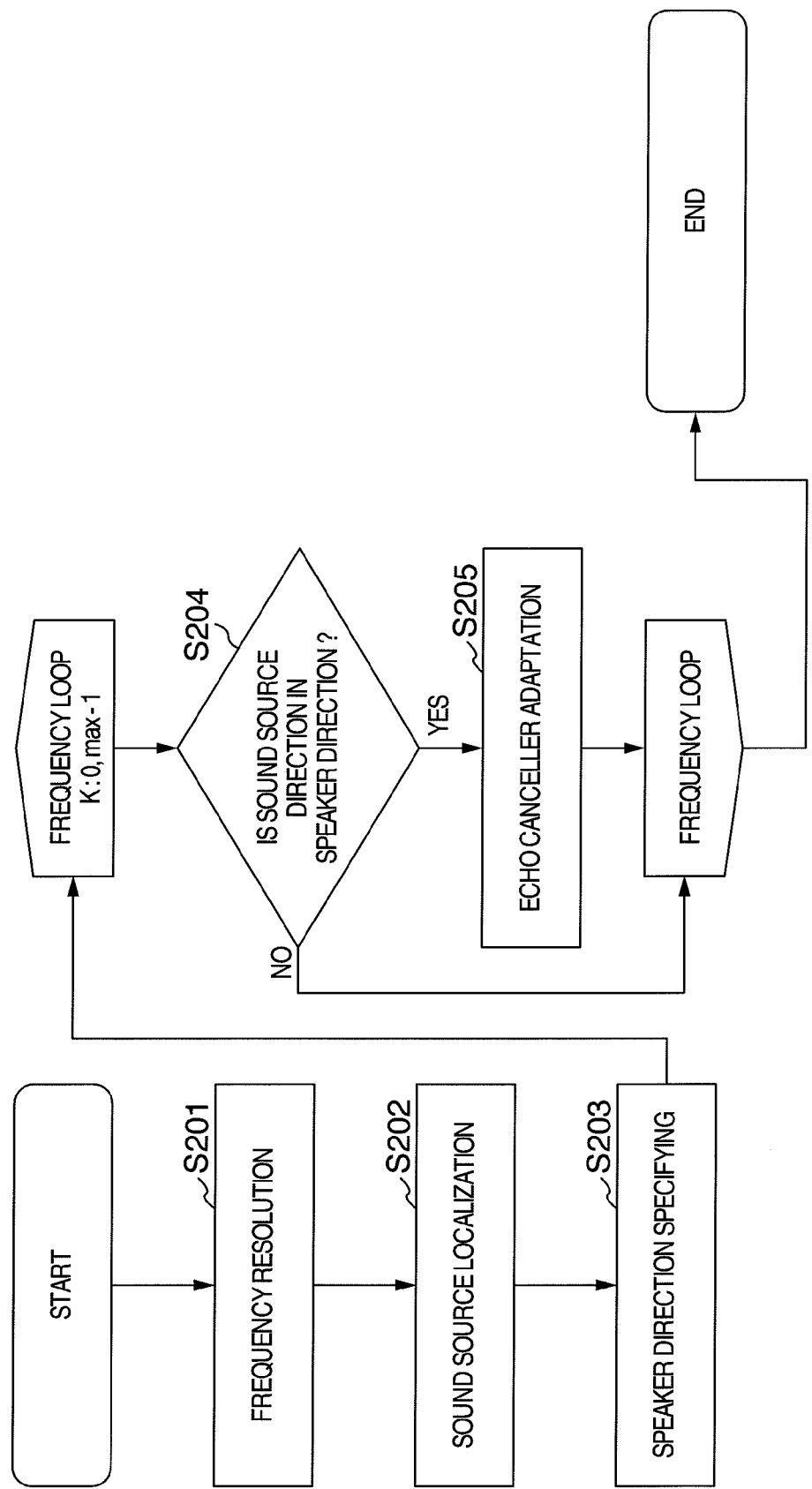
FIG. 13 is a flow diagram of echo canceller adaptation control by each of frequencies, utilizing a sound source direction.

FIG. 13 shows an adaptation process flow, wherein only time-frequency components coming from a speaker direction is judged as the acoustic echo, by utilization of information on a sound source direction.

In frequency resolution S201, the recorded voice is converted to the time-frequency band signal.

In sound source localization S202, a sound source direction is estimated, based on a modified delay summation array method. The modified delay summation array method, used to estimate the sound source direction in the present invention judges as to from which direction the component comes by each time-frequency.

As shown in FIG. 11, because a voice is a sparse signal when viewed by each time-frequency, it is presumed to be split into components majoring in acoustic echo and components majoring in non-acoustic echo, by each time-frequency. Therefore, by selecting time-frequency components coming from a speaker direction, based on the result of the sound source assigned position, which was estimated by each time-frequency, the components can be considered to be the components majoring in acoustic echo.

In the modified delay summation array method, sound source localization is carried out by using a steering vector $A\theta(f)$ of a sound source direction $\theta$. When M represents number of the microphones, $A\theta(f)$ is an M-dimensional complex vector.

Here, f represents frequency bin number; $X(f,\tau)$ represents time-frequency expression of an input signal; and $\tau$ represents frame number of the short time Fourier transformation. $X(f,\tau)$ is an M-dimensional complex vector, and a vector having frame $\tau$ of each of the microphone elements, and a component of frequency f, as the elements.

In the modified delay summation array method, an imaginary sound source direction $\theta$ providing maximal $|A\theta(f)*X(f,\tau)|$ is estimated as a sound source direction having a frame of $\tau$ and a frequency of f.

In the identification S203 of a speaker direction, a histogram is prepared by stacking of number of frequency f estimated that a sound source direction is $\theta$ by each imaginary sound source direction $\theta$, or $\log|A\theta(f)*X(f,\tau)|$. Then the peak of the histogram within a range of the predetermined speaker direction (that is determined, for example, from −30 degree to 30 degree or the like) is calculated, and that direction is set as the speaker direction $\theta$sp.

In the case where the sound source direction is a speaker direction, or an estimated sound source direction $\theta'$ of frequency f satisfies $|\theta'-\theta sp|<\beta$ in the judgment of S204, that frequency f is judged to be a frequency component coming from the speaker direction. Namely it is judged to be acoustic echo components and the echo canceller adaptation S205 is carried out.

After carrying out S204 and S205 at all frequencies, adaptation processing of the acoustic echo canceller is terminated.

Figure 14:
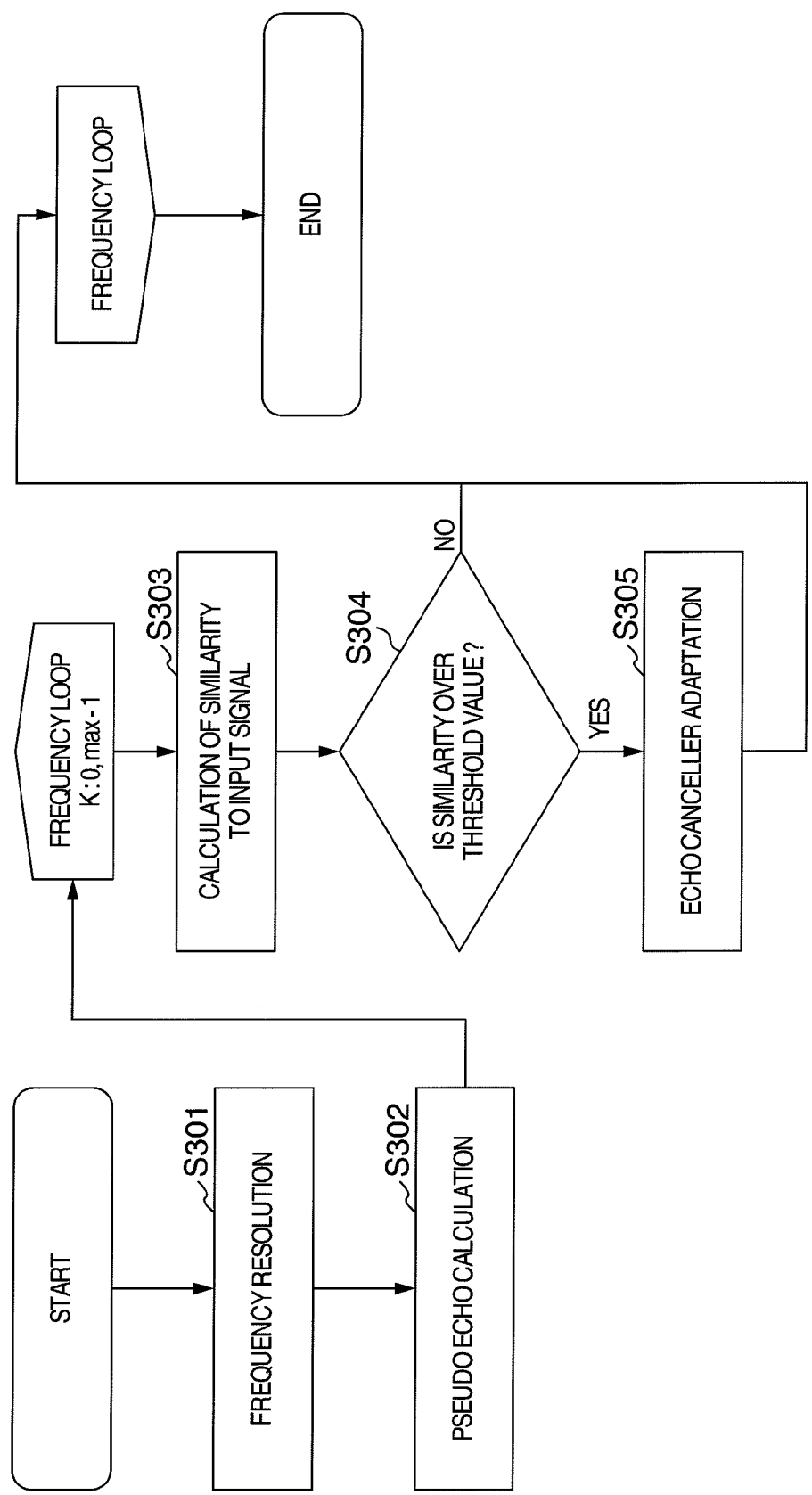
FIG. 14 is a flow diagram of echo canceller adaptation control by each of frequencies, utilizing information similar to a sound source direction.

Then, FIG. 14 shows acoustic echo canceller adaptation processing, by utilizing information similar to a sound source direction that can be calculated from the pseudo echo.

By carrying out frequency resolution S301, a recorded voice is converted to the frequency band signal.

By multiplying the acoustic echo filter on thus converted frequency band signal, calculation S302 of the pseudo echo is carried out.

The calculation S303 of similarity between the pseudo echo calculated by each frequency f, and an input signal, is carried out. In the calculation processing of the similarity, the pseudo echo $E(f,\tau)$ is used. $E(f,\tau)$ is an M-dimensional vector, having frame $\tau$ of each of the microphone elements, and the pseudo eco components of frequency f, as the elements. The 0-th element of $E(f,\tau)$ is described as $E0(f,\tau)$. The following definitions are used: $E'(f,\tau)=E(f,\tau)/E0(f,\tau)$, further $E''(f,\tau)=E'(f,\tau)/|E'(f,\tau)|$, and $|E''(f,\tau)*X(f,\tau)|/|X(f,\tau)|$ for the similarity.

This similarity looks at a similarity of sound source directions of the acoustic echo components and the input signal, and in the case where only the acoustic echo components are included in the input signal, the similarity becomes 1. Value obtained by multiplying threshold value $\alpha(f)$, which is different by frequency, on the similarity, is used as a final similarity. Here, $\alpha(f)=1/\Sigma''(f,\tau)*A\theta(f)|$.

In the case where the similarity is over a predetermined threshold value "th" (S304), adaptation S305 of the echo canceller, is carried out, while the similarity is below the predetermined threshold value, the adaptation S305 of the echo canceller, is not carried out.

After carrying out from S303 to S305 by each of the all frequencies, the adaptation processing of the acoustic echo canceller is terminated.

Figure 15:
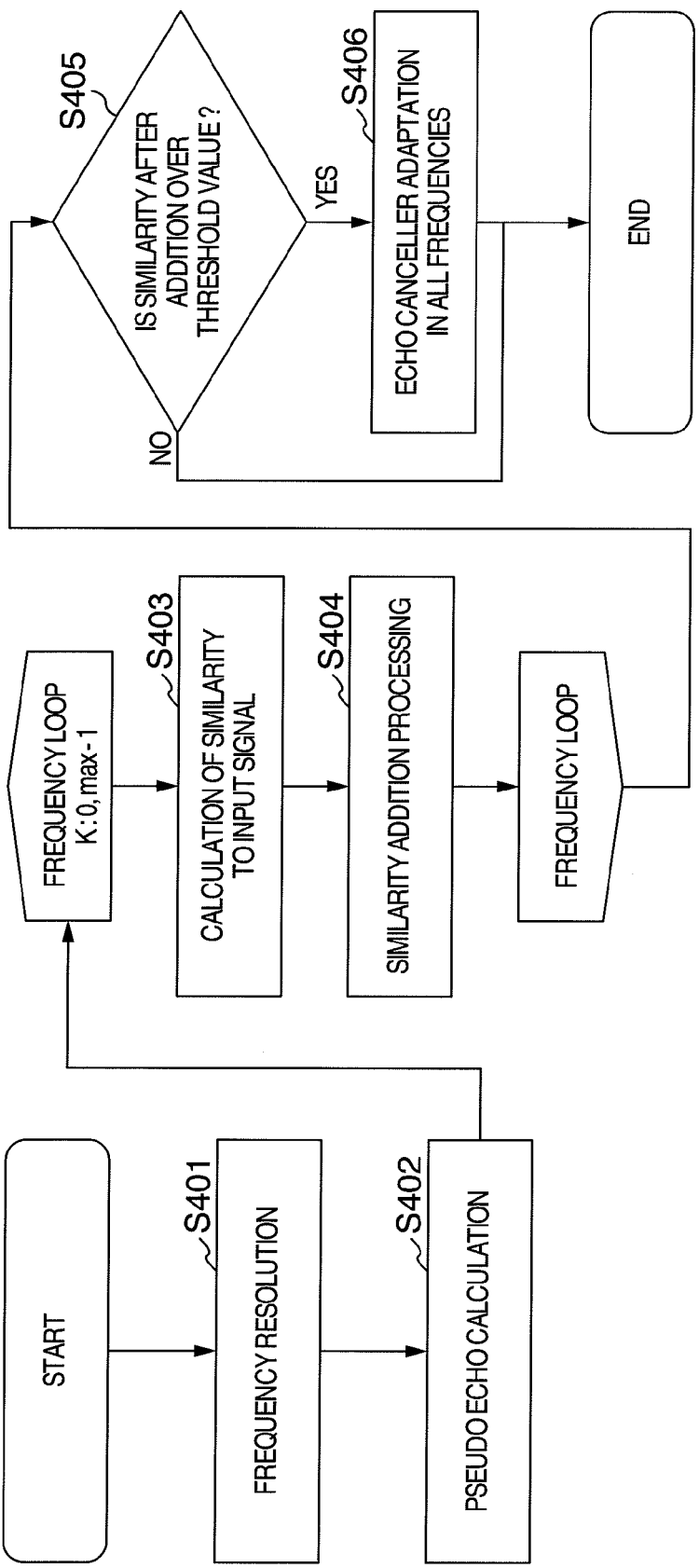
FIG. 15 is a flow diagram of echo canceller adaptation control of whole frequency components, utilizing information similar to a sound source direction.

FIG. 15 shows acoustic echo canceller adaptation processing, by using information similar to a sound source direction that can be calculated by pseudo echo. In the present processing, whether the acoustic echo canceller is adapted or not is the same for all frequency components within a frame.

By carrying out frequency resolution S401, a recorded voice is converted to the frequency band signal. By multiplying acoustic echo filter on thus converted frequency band signal, calculation S402 of the pseudo echo, is carried out.

Calculation S403 of similarity between the pseudo echo calculated by each frequency f, and an input signal, is carried out.

In the calculation processing of the similarity, the pseudo echo $E(f,\tau)$ is used. $E(f,\tau)$ is an M-dimensional vector, having frame $\tau$ of each of the microphone elements, and the pseudo echo components of frequency f, as the elements. The 0-th element of $E(f,\tau)$ is described as $E0(f,\tau)$. The following definitions are used: $E'(f,\tau)=E(f,\tau)/E0(f,\tau)$, further $E''(f,\tau)=E'(f,\tau)/|E'(f,\tau)|$, and $|E''(f,\tau)*X(f,\tau)|/|X(f,\tau)|$ for the similarity.

This similarity provides a similarity of sound source directions of the acoustic echo components and the input signal, and in the case where only the acoustic echo components are included in the input signal, the similarity becomes 1. Value obtained by multiplying threshold value $\alpha(f)$, which is different by frequency, on the similarity, is used as a final similarity. Here, $\alpha(f)=1/\Sigma|E''(f,\tau)*A\theta(f)|$. The calculation of the similarity is carried out by each of all frequencies, and addition S404 of the similarity of all frequencies is carried out.

In the case where the similarity is over a predetermined threshold value "th" (S405), adaptation S406 of the echo canceller, is carried out for all frequency components, while the similarity is below the predetermined threshold value, the adaptation S406 of the echo canceller, is not carried out to terminate the acoustic echo canceller adaptation processing. In addition, in the case where the adaptation is carried out, after carrying out the echo canceller adaptation S406, the acoustic echo canceller adaptation processing is terminated.

Figure 16:
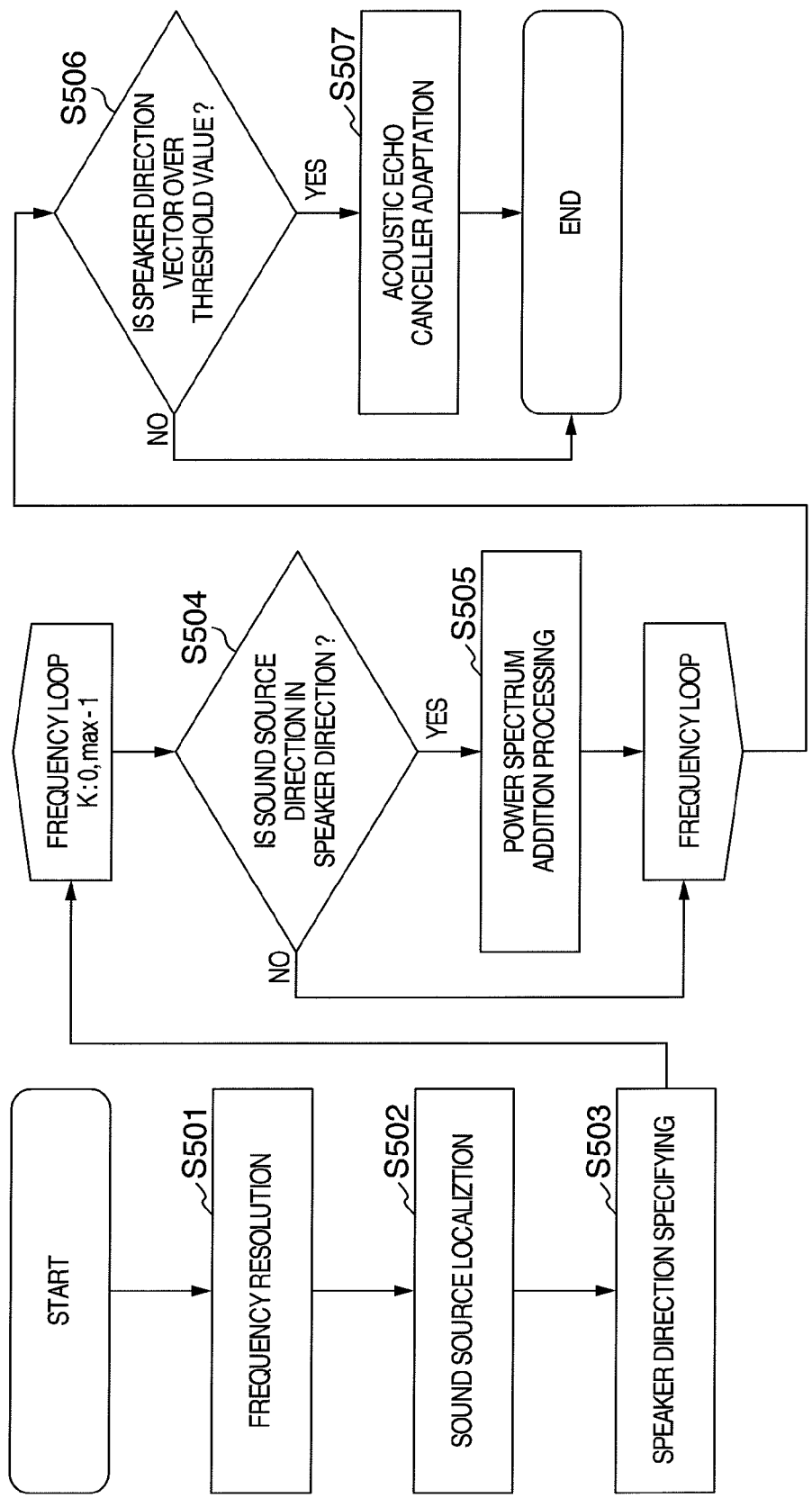
FIG. 16 is a flow diagram of echo canceller adaptation control by each of frequencies, utilizing a sound source direction.

FIG. 16 shows a flow of adaptation processing, wherein only time-frequency components coming from a speaker direction is judged as acoustic echo, using sound source direction information.

In the present processing, whether the acoustic echo canceller is adapted or not is the same for all frequency components within a frame.

In the frequency resolution S501, a recorded voice is converted to the time-frequency band signal. In the sound source assigned position S502, a sound source direction is estimated based on the modified delay summation array method.

In the modified delay summation array method, sound source assigned position is carried out by using a steering vector Aθ(f) of a sound source direction θ. When M represents number of the microphones, Aθ(f) is an M-dimensional complex vector.

Here, f represents frequency bin number; X(f,τ) represents time-frequency expression of an input signal; and τ represents frame number of the short time Fourier transformation. X(f,τ) is an M-dimensional complex vector, and a vector having frame τ of each of the microphone elements, and a component of frequency f, as the elements.

In the modified delay summation array method, an imaginary sound source direction θ providing maximal |Aθ(f)*X(f,τ)| is estimated as a sound source direction having a frame of τ and a frequency of f.

In the identification S503 of a speaker direction, a histogram is prepared by stacking of number of frequency f estimated that a sound source direction is θ by each imaginary sound source direction θ, or log|Aθ(f)*X(f,τ)|. Then the peak of the histogram within a range of the predetermined speaker direction (that is determined, for example, from –30 degree to 30 degree or the like) is calculated, and that direction is set as the speaker direction θsp.

In the case where the sound source direction is a speaker direction, or an estimated sound source direction O' of frequency f satisfies |θ'−θsp|<β in judgment S504, that frequency f is judged to be a frequency component coming from the speaker direction. Then, a power spectrum added in a frequency direction is obtained by stacking of number of frequency f estimated to be the speaker direction, or log|Aθ(f)*X(f,τ)|. Judgment S506 on whether the power spectrum added in all frequencies is equal to or more than specified in advance, is carried out, and in the case where it is equal to more than threshold value, echo canceller adaptation S507 for all frequency components, is carried out to terminate the processing.

Figure 17:
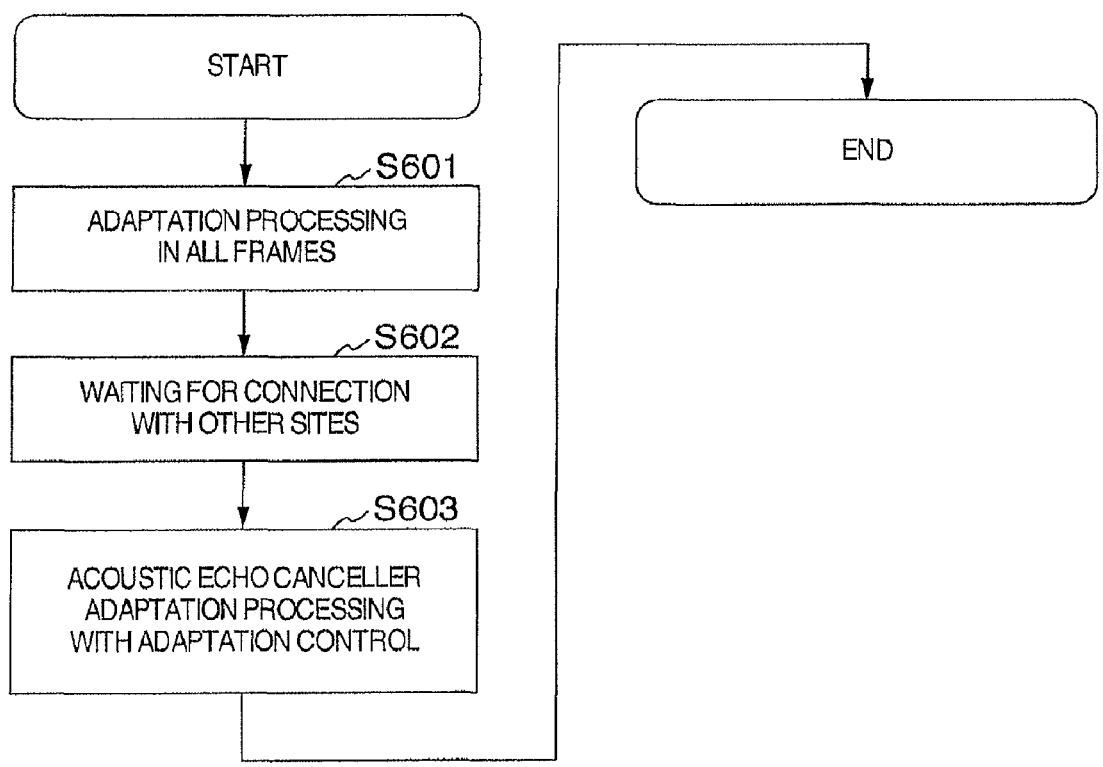
FIG. 17 is a process flow diagram for carrying out adaptation processing before starting a TV conference.

FIG. 17 shows a process flow in the case where the acoustic echo canceller is subjected to adaptation in advance.

Before connecting with other sites, adaptation processing S601 of the acoustic echo canceller, is carried out using all frame data during the speaker at the own site is providing a sound.

This corresponds to carry out the adaptation processing of the acoustic echo canceller unconditionally, without carrying out double talk detection of the present invention.

Then, waiting S602 for connection with other sites, is carried out, and the system waits till the connection request comes from other sites, or the connection request with other sites comes by a user of the own site.

After the connection to other sites, acoustic echo canceller adaptation processing S603, with adaptation control by double talk detection processing of the present invention, is repeated, and after the TV system is disconnected, the system is terminated.

Figure 18:
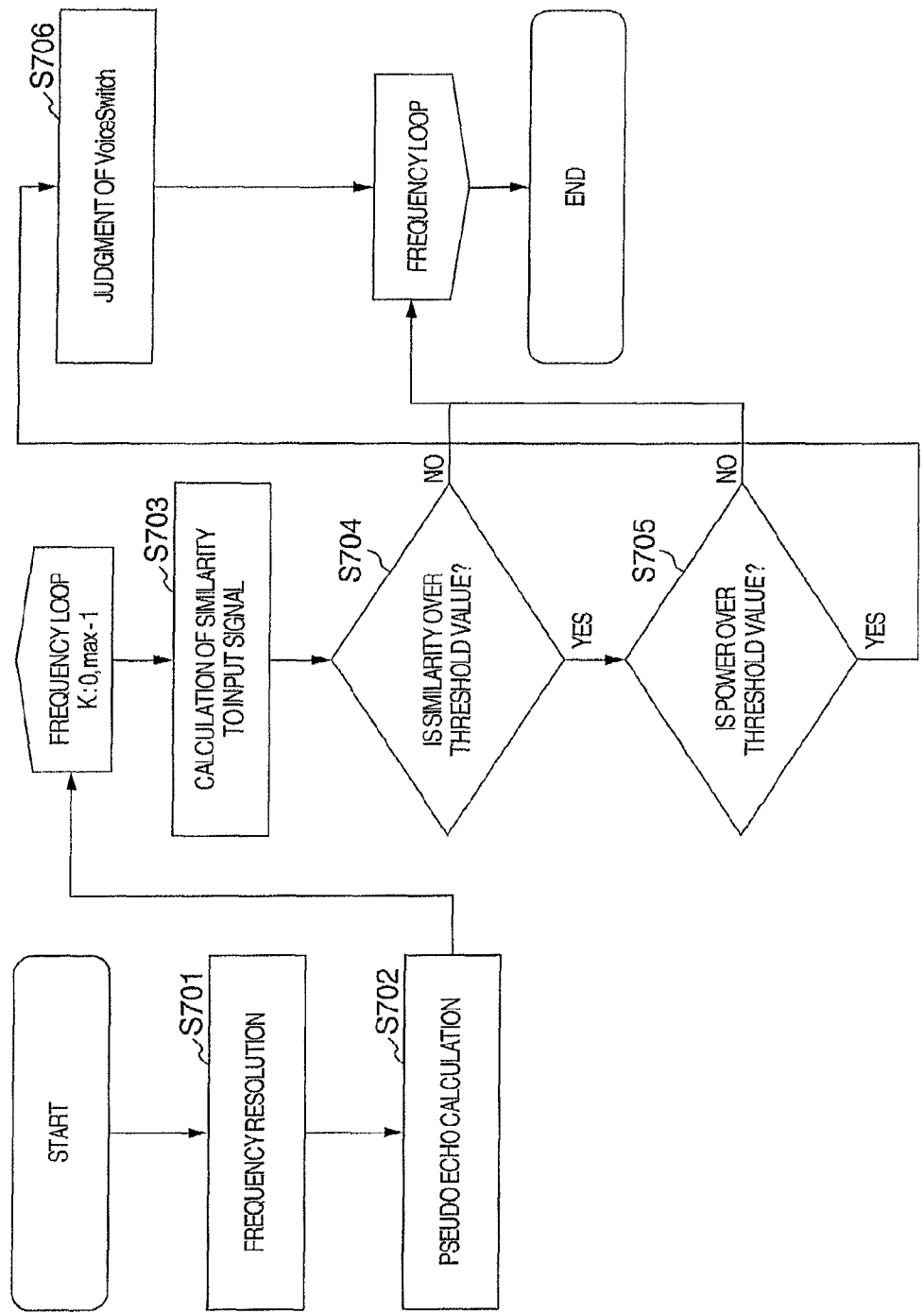
FIG. 18 is a flow diagram of VoiceSwitch control by each of frequencies, utilizing information similar to a sound source direction.

FIG. 18 shows a flow for carrying out non-linear processing control by VoiceSwitch, by using the similarity of the input signal and the pseudo echo.

By carrying out frequency resolution S701, a recorded voice is converted to the frequency band signal.

By multiplying acoustic echo filter on thus converted frequency band signal, calculation S702 of the pseudo echo, is carried out.

Calculation S703 of similarity between the pseudo echo calculated by each frequency f, and an input signal, is carried out.

In the calculation processing of the similarity, the pseudo echo $E(f,\tau)$ is used. $E(f,\tau)$ is an M-dimensional vector, having frame τ of each of the microphone elements, and the pseudo echo components of frequency f, as the elements. The 0-th element of $E(f,\tau)$ is described as $E0(f,\tau)$. The following definitions are used: $E'(f,\tau)=E(f,\tau)/E0(f,\tau)$, further $E''(f,\tau)=E'(f,\tau)/|E'(f,\tau)|$, and $|E''(f,\tau)*X(f,\tau)|/|X(f,\tau)|$ for the similarity. This similarity provides a similarity of sound source directions of the acoustic echo components and the input signal, and in the case where only the acoustic echo components are included in the input signal, the similarity becomes 1. Value obtained by multiplying threshold value α(f), which is different by frequency, on the similarity, is used as a final similarity. Here, $\alpha(f)=1/\Sigma|E''(f,\tau)*A\theta(f)|$.

In the case where the similarity is over a predetermined threshold value "th" (S704), and the power of the input signal is equal to or greater than threshold value, the frequency components in the voice to be transmitted are set 0, while in the case other than this, the signal after echo canceling is used as the frequency components in the voice to be transmitted to terminate the processing.

Figure 19:
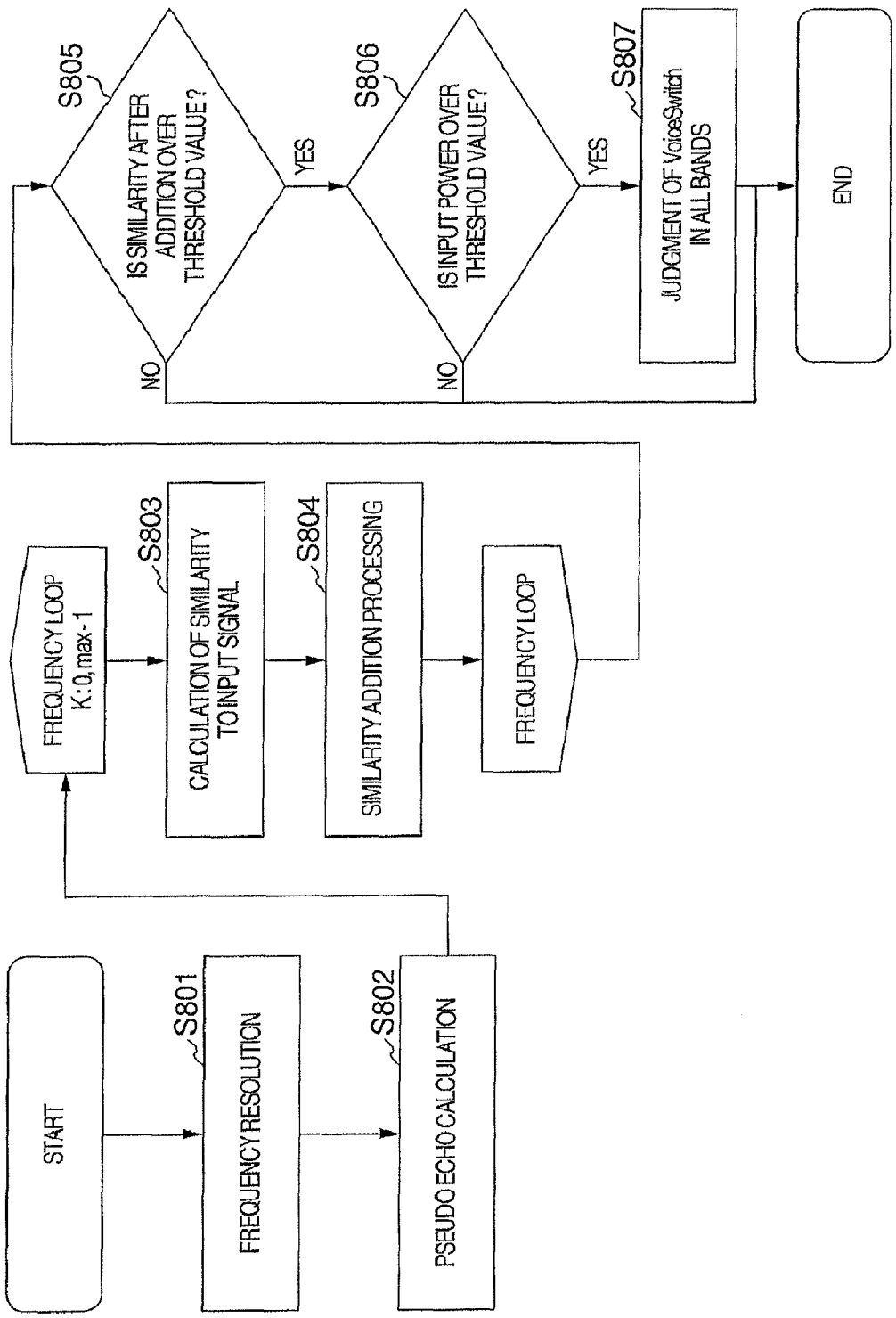
FIG. 19 is a flow diagram of VoiceSwitch control of all frequencies, utilizing information similar to a sound source direction.

FIG. 19 shows a flow for carrying out non-linear processing control by VoiceSwitch, by using the similarity of the input signal and the pseudo echo. The judgment, on whether or not VoiceSwitch is used, is common to all frequencies.

By carrying out frequency resolution S801, a recorded voice is converted to the frequency band signal. By multiplying acoustic echo filter on thus converted frequency band signal, calculation S802 of the pseudo echo, is carried out. Calculation S803 of similarity between the pseudo echo calculated by each frequency f, and an input signal, is carried out.

In the calculation processing of the similarity, the pseudo echo $E(f,\tau)$ is used. $E(f,\tau)$ is an M-dimensional vector, having frame τ of each of the microphone elements, and the pseudo echo components of frequency f, as the elements. The 0-th element of $E(f,\tau)$ is described as $E0(f,\tau)$. The following definitions are used: $E'(f,\tau)=E(f,\tau)/E0(f,\tau)$, further $E''(f,\tau)=E'(f,\tau)/|E'(f,\tau)|$, and $|E''(f,\tau)*X(f,\tau)|/|X(f,\tau)|$ for the similarity. This similarity provides a similarity of sound source directions of the acoustic echo components and the input signal, and in the case where only the acoustic echo components are included in the input signal, the similarity becomes 1. Value obtained by multiplying threshold value α(f), which is different by frequency, on the similarity, is used as a final similarity. Here, $\alpha(f)=1/\Sigma|E''(f,\tau)*A\theta(f)|$. The similarity is added at all frequencies.

Then, in the case where the similarity after the addition is over a predetermined threshold value "th" (S805), and the power of the input signal is equal to or greater than threshold value, the voice signal to be transmitted is set 0, while in the case other than this, the signal after echo canceling is used as the voice to be transmitted to terminate the processing.

FIG. 20 shows a process flow for carrying out control of nonlinear suppression coefficient of the residual echo after the acoustic echo canceling, by using the similarity of the input signal and the pseudo echo.

By carrying out frequency resolution S901, a recorded voice is converted to the frequency band signal.

By multiplying acoustic echo filter on thus converted frequency band signal, calculation S902 of the pseudo echo, is carried out.

Calculation S903 of similarity between the pseudo echo calculated by each frequency f, and an input signal, is carried out.

In the calculation processing of the similarity, the pseudo echo $E(f,\tau)$ is used. $E(f,\tau)$ is an M-dimensional vector, having frame $\tau$ of each of the microphone elements, and the pseudo echo components of frequency f, as the elements. The 0-th element of $E(f, \tau)$ is described as $E0(f, \tau)$. The following definitions are used: $E'(f,\tau)=E(f,\tau)/E0(f,\tau)$, further $E''(f,\tau)=E'(f,\tau)/|E'(f,\tau)|$, and $|E''(f,\tau)*X(f,\tau)|/|X(f,\tau)$ for the similarity. This similarity provides a similarity of sound source directions of the acoustic echo components and the input signal, and in the case where only the acoustic echo components are included in the input signal, the similarity becomes 1. Value obtained by multiplying threshold value $\alpha(f)$, which is different by frequency, on the similarity, is used as a final similarity. Here, $\alpha(f)=1/\Sigma|E''(f,\tau)*A\theta(f)|$.

In the case where the similarity is over a predetermined threshold value "th" (S904), and the power of the input signal is equal to or greater than threshold value, the nonlinear suppression coefficient $\alpha$ is set to predetermined value $\alpha 0$. In the case other than this, the nonlinear suppression coefficient $\alpha$ is set to $\alpha 1$, wherein it is predetermined that $\alpha 0 > \alpha 1$.

A signal after acoustic echo canceling S907, is set as $n'(f,\tau)$, and pseudo echo components as $e(f,\tau)$. In the non-linear suppression processing S908, $n''(f,\tau)$ is output, as $n''(f,\tau)=\text{Floor}(|n'(f,\tau)|-|e(f,\tau)|\arg(n'(f,\tau)))$. Here, Floor (x) is a function to give x, in the case where x is equal to or larger than 0, and to give 0 in the case where x is equal to or smaller than 0; and arg(x) is a function to give a phase component of X. After carrying out the nonlinear suppression processing at all frequencies, the processing is terminated.

As described above, according to the present invention, control of the acoustic echo can be realized in a telephone conference system or a TV conference system, and can be applied to acoustic echo canceling technology in a double talk state.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An acoustic echo canceller system comprising:
a microphone for inputting a voice;
an A/D converter for digital converting a signal from the microphone;
an information processing apparatus for processing the digital signal from the A/D converter to suppress acoustic echo components;
an output interface for transmitting the signal from the information processing apparatus to a network;
an input interface for receiving the signal from the network;
an D/A converter for analogue converting the signal from the input interface; and
a speaker for outputting the signal from the D/A converter as a voice;
wherein the microphone is microphone array having a plurality of microphone elements,
the A/D converter is a plurality of A/D converters for digital converting a signal by each of the microphone elements,
the information processing apparatus includes an acoustic echo canceller adaptation unit for adaptation of an adaptive filter, an acoustic echo canceller unit for removal of acoustic echo components, a band splitting unit for band dividing the digital signal, a phase difference calculation unit for calculating phase difference between voices input to the plurality of microphone elements, based on the signal from the plurality of A/D converters and a frequency sorting unit for judging whether the voice input to the microphone array is voice from the speaker or not, based on phase difference, which the phase difference calculation unit outputs,
the band splitting unit band-splits each of the digitally converted signals by each of the microphone elements,
the phase difference calculation unit calculates phase difference among the voices input to the plurality of microphone elements, by each of the split bands,
the frequency sorting unit judges whether the band splitting signal is a speaker output signal or a talker signal, based on phase difference by each of the bands, that the phase difference calculation unit outputs,
the acoustic echo canceller adaptation unit carries out adaptation of the adaptive filter used to suppress mixed components of the voice from the speaker, from the signal of the microphone elements, only for a band judged to be a speaker output signal by the frequency sorting unit, and
the acoustic echo canceller unit removes the acoustic echo components from the signal of each of the microphone elements, using the adaptive filter.

2. The acoustic echo canceller system according to claim 1, wherein the frequency sorting unit is arranged such that, in order to judge whether the band splitting signal is the speaker output signal or not at the frequency sorting unit, a transfer function of a sound, which is transmitted from the speaker to the microphone array, is measured in advance; a phase difference of the microphone array by each of the bands, in outputting a sound from the speaker, is calculated from said transfer function of said sound measured; the phase difference by each of said bands is stored in an external storage; and in the case where a difference between the phase difference already stored and the phase difference among the microphone elements by each of the bands of the band splitting signal is equal to or smaller than a predetermined threshold value, said band splitting signal is judged to be the speaker output signal.

3. The acoustic echo canceller system according to claim 1, further comprising a user interface wherein a user specifies number of speakers, and a relative physical locations of the speakers to the microphone array in advance; the echo phase difference calculation processing unit for calculating phase difference of the microphone array by each of the bands, in outputting a sound from the speakers, based on the number and the relative physical locations of the speakers, specified by said user interface; and the frequency sorting unit, wherein the phase difference by each of said bands is stored in an external storage, and in the case where the phase difference already stored and the phase difference among the microphone elements, by each of the bands of the band splitting signal, is equal to or smaller than the predetermined threshold value, said band splitting signal is judged to be the speaker output signal.

4. The acoustic echo canceller system according to claim 1, comprising a sound source localization unit which calculates a histogram in a sound source direction over bands by using phase difference of each of the microphone array and estimates a sound source direction from said histogram, wherein a level of a signal is calculated, that signal being estimated to have come from a sound source direction that said sound source localization unit calculated; and in the case where the signal level calculated is equal to or lower than a predetermined level, by comparing a level of the band splitting signal judged to be the speaker output signal, or a level of the band splitting signal judged to be the speaker output signal at the band splitting signal after the acoustic echo canceller, all the levels of said band splitting signals are set to zero.

5. The acoustic echo canceller system according to claim 1, further comprising:
   a unit for estimating a sound source direction;
   a unit for specifying a speaker direction; and
   a unit for comparing the sound source direction and the speaker direction; and
   in the case where the sound source direction is judged to coincide the speaker direction, said sound source is judged to be acoustic echo components, and echo canceller adaptation is carried out.

6. The acoustic echo canceller system according to claim 1, further comprising:
   a unit for multiplying acoustic echo filter on a converted frequency band signal, to calculate pseudo echo; and
   a unit for calculating a similarity between the pseudo echo calculated by each of the frequencies, and the input signal;
   and in the case where the similarity is larger than a predetermined threshold value, the echo canceller adaptation is carried out.

7. The acoustic echo canceller system according to claim 1, further comprising:
   a unit for multiplying acoustic echo filter on a converted frequency band signal, to calculate pseudo echo;
   a unit for calculating a similarity between the pseudo echo calculated by each of the frequencies, and the input signal; and
   a unit for adding the similarity of all frequencies;
   and in the case where the similarity added is larger than the predetermined threshold value, the echo canceller adaptation is carried out.

8. The acoustic echo canceller system according to claim 1, further comprising:
   a unit for estimating a sound source direction;
   a unit for specifying a speaker direction;
   a unit for comparing the sound source direction and the speaker direction;
   in the case where the sound source direction is judged to coincide the speaker direction, a unit for judging said sound source to be acoustic echo components; and
   a unit for obtaining a power spectrum by adding the sound source judged to be the speaker direction in a frequency direction;
   and in the case where the power spectrum added at all frequencies is larger than the predetermined threshold value, the echo canceller adaptation is carried out.

* * * * *